(12) United States Patent

MacKay Pett

(10) Patent No.: US 12,678,739 B1

(45) Date of Patent: Jul. 14, 2026

(54) REVERSE OSMOSIS METHODS

(71) Applicant: OZONO POLARIS, S.A.P.I. de C.V., Puebla (MX)

(72) Inventor: David Ross MacKay Pett, Puebla (MX)

(73) Assignee: Ozono Polaris, S.A. de C.V., Puebla (MX)

( * ) Notice: Subject to any disclaimer, the term of this patent is extended or adjusted under 35 U.S.C. 154(b) by 0 days.

(21) Appl. No.: 19/332,778

(22) Filed: Sep. 18, 2025

Related U.S. Application Data

(60) Division of application No. 19/184,453, filed on Apr. 21, 2025, now Pat. No. 12,472,467, which is a
(Continued)

(51) Int. Cl.
    B01D 61/02        (2006.01)
    B01D 61/06        (2006.01)
    (Continued)

(52) U.S. Cl.
    CPC ........... B01D 61/08 (2013.01); B01D 61/025 (2013.01); B01D 61/06 (2013.01);
    (Continued)

(58) Field of Classification Search
    CPC ...... B01D 61/08; B01D 61/025; B01D 61/06; B01D 2313/18; B01D 2313/243;
    (Continued)

(56) References Cited

U.S. PATENT DOCUMENTS

| | | | |
|---|---|---|---|
| 9,821,274 B1 | 11/2017 | de los Reyes et al. |
| 10,245,556 B2 | 4/2019 | Gilron et al. |

(Continued)

FOREIGN PATENT DOCUMENTS

| | | |
|---|---|---|
| JP | S61-220707 A | 10/1986 |
| JP | 2013158732 A | 8/2013 |

(Continued)

OTHER PUBLICATIONS

International Search Report and Written Opinion based on PCT/IB24/56735 mailed Nov. 13, 2024.

(Continued)

*Primary Examiner* — Pranav N Patel
(74) *Attorney, Agent, or Firm* — Heslin Rothenberg Farley & Mesiti P.C.

(57) ABSTRACT

A reverse osmosis system includes a pressure vessel comprising first and second ports. Membranes disposed in the pressure vessel, permeate water and block permeation of dissolved solids from concentrate flowing between the first and second ports. A high pressure pump includes an inlet and an outlet. A circulation pump includes an inlet and an outlet and is configured to circulate the concentrate between the first and second ports. A valved circulation apparatus is configured to select between a forward flow mode and a discharge mode of the system. In the forward flow mode, the circulation pump inlet is connected to the second port and the circulation pump outlet is connected to the first port. In the discharge mode, the circulation pump inlet is connected to the high pressure pump inlet and the circulation pump outlet is connected to the first port and production of permeate is prevented.

6 Claims, 21 Drawing Sheets

Forward Flow Mode

Related U.S. Application Data continuation of application No. PCT/IB2025/050384, filed on Jan. 13, 2025, which is a continuation-in-part of application No. PCT/IB2024/056735, filed on Jul. 10, 2024.

(51) Int. Cl.
  *B01D 61/08*  (2006.01)
  *C02F 1/44*  (2023.01)

(52) U.S. Cl.
  CPC .... *B01D 2313/18* (2013.01); *B01D 2313/243* (2013.01); *B01D 2321/2083* (2013.01)

(58) Field of Classification Search
  CPC ............ B01D 2321/2083; B01D 61/02; B01D 61/027; B01D 61/12; B01D 2313/246; B01D 2311/246; B01D 65/08; B01D 2315/10; B01D 2311/04; B01D 2311/08; B01D 2311/252; B01D 2311/2523; B01D 2311/2532; B01D 2321/02
  See application file for complete search history.

(56) References Cited

U.S. PATENT DOCUMENTS

| | | | |
|---|---|---|---|
| 11,230,479 | B2 | 1/2022 | Mack et al. |
| 2002/0108906 | A1 | 8/2002 | Husain et al. |
| 2004/0168978 | A1 | 9/2004 | Gray et al. |
| 2014/0061129 | A1 | 3/2014 | Hoz |
| 2019/0160431 | A1 | 5/2019 | Warsinger et al. |
| 2019/0322548 | A1* | 10/2019 | Mack ...................... C02F 1/441 |
| 2023/0372872 | A1 | 11/2023 | Matsui et al. |

FOREIGN PATENT DOCUMENTS

| | | | |
|---|---|---|---|
| WO | 2008/094456 | A1 | 8/2008 |
| WO | 2015/167333 | A1 | 11/2015 |
| WO | 2017/210800 | A1 | 12/2017 |
| WO | 2024108038 | A1 | 5/2024 |

OTHER PUBLICATIONS

International Search Report and Written Opinion based on PCT/IB2025/050384 mailed on May 21, 2025.

* cited by examiner

Forward Flow Mode

FIG. 3B

Forward Discharge Mode

FIG. 3C

Forward Discharge Mode

FIG. 3D

Forward Discharge Mode

Forward Flow Mode

Forward Discharge Mode

FIG. 5C

Reverse Flow Mode

Permeate/Water—114

Feed Water

FIG. 5D

Reverse Discharge Mode

FIG. 5E

Forward Discharge Mode

200

ERD

115HP

115LP

Feed Water

FIG. 5F

Reverse Discharge Mode

FIG. 5G

Forward Discharge Mode

FIG. 5H

Reverse Discharge Mode

Figure 6A:
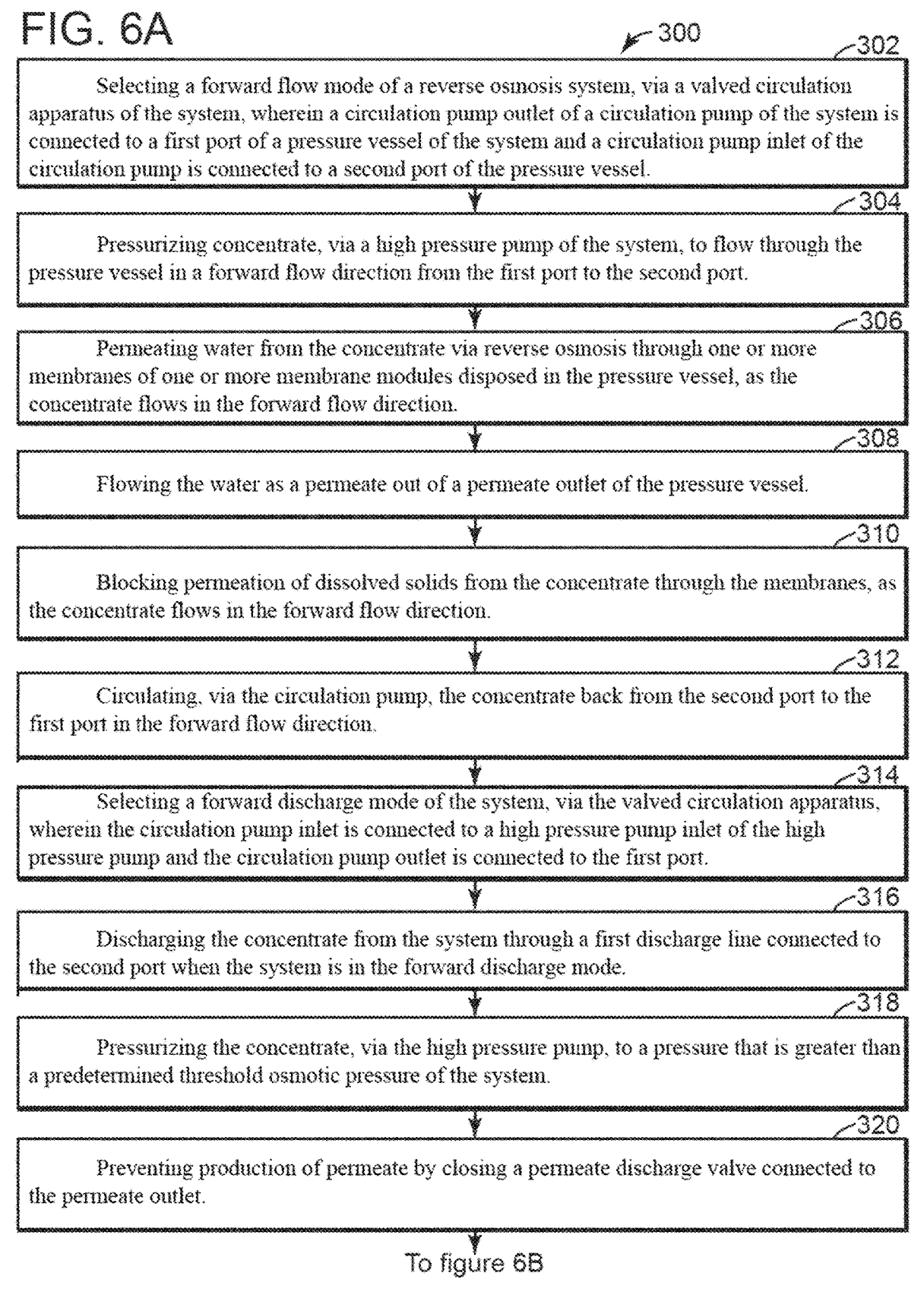

Selecting a forward flow mode of a reverse osmosis system, via a valved circulation apparatus of the system, wherein a circulation pump outlet of a circulation pump of the system is connected to a first port of a pressure vessel of the system and a circulation pump inlet of the circulation pump is connected to a second port of the pressure vessel.

⟋304

Pressurizing concentrate, via a high pressure pump of the system, to flow through the pressure vessel in a forward flow direction from the first port to the second port.

⟋306

Permeating water from the concentrate via reverse osmosis through one or more membranes of one or more membrane modules disposed in the pressure vessel, as the concentrate flows in the forward flow direction.

⟋308

Flowing the water as a permeate out of a permeate outlet of the pressure vessel.

⟋310

Blocking permeation of dissolved solids from the concentrate through the membranes, as the concentrate flows in the forward flow direction.

⟋312

Circulating, via the circulation pump, the concentrate back from the second port to the first port in the forward flow direction.

⟋314

Selecting a forward discharge mode of the system, via the valved circulation apparatus, wherein the circulation pump inlet is connected to a high pressure pump inlet of the high pressure pump and the circulation pump outlet is connected to the first port.

⟋316

Discharging the concentrate from the system through a first discharge line connected to the second port when the system is in the forward discharge mode.

⟋318

Pressurizing the concentrate, via the high pressure pump, to a pressure that is greater than a predetermined threshold osmotic pressure of the system.

⟋320

Preventing production of permeate by closing a permeate discharge valve connected to the permeate outlet.

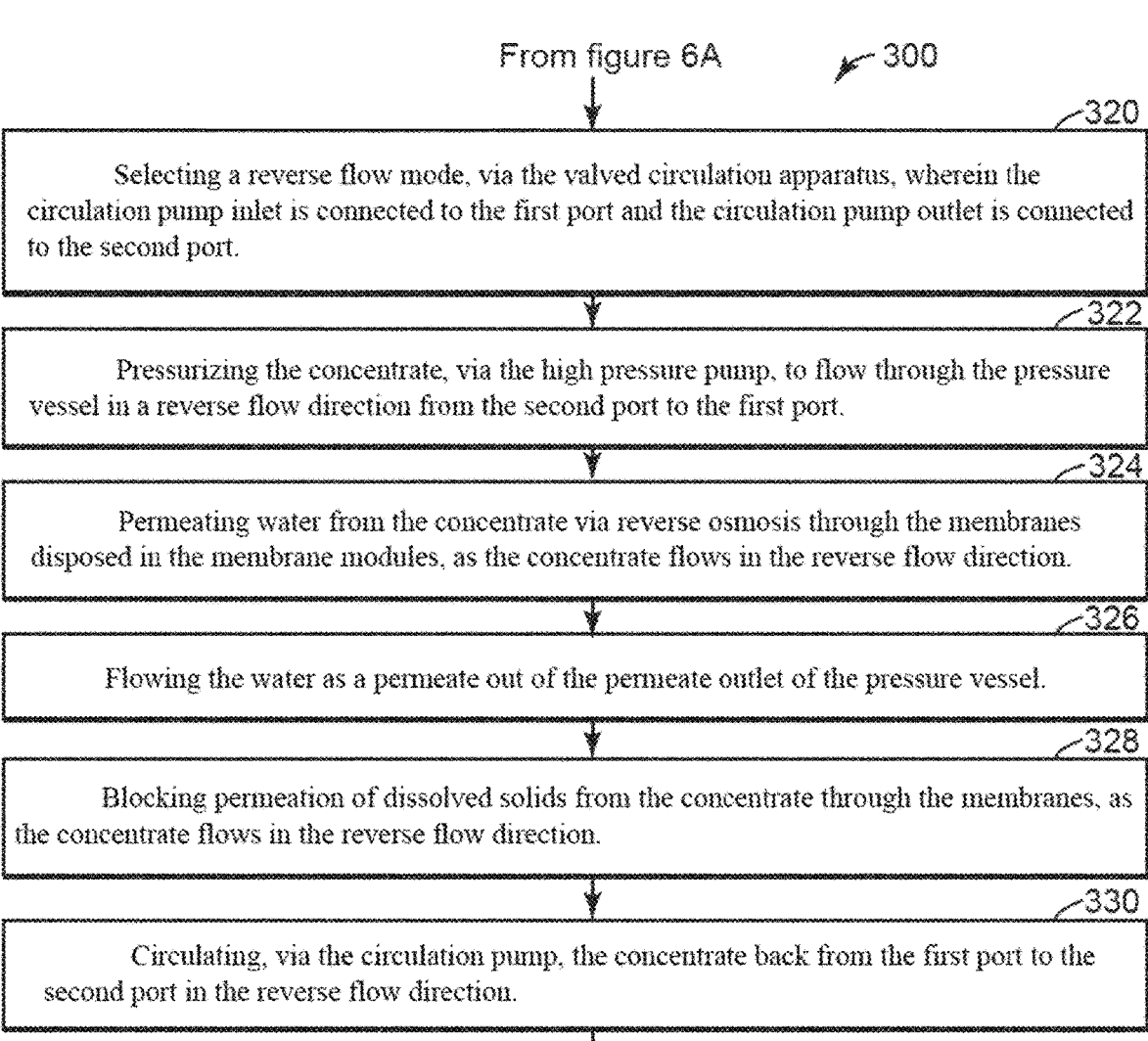

From figure 6A    300

320
Selecting a reverse flow mode, via the valved circulation apparatus, wherein the circulation pump inlet is connected to the first port and the circulation pump outlet is connected to the second port.

322
Pressurizing the concentrate, via the high pressure pump, to flow through the pressure vessel in a reverse flow direction from the second port to the first port.

324
Permeating water from the concentrate via reverse osmosis through the membranes disposed in the membrane modules, as the concentrate flows in the reverse flow direction.

326
Flowing the water as a permeate out of the permeate outlet of the pressure vessel.

328
Blocking permeation of dissolved solids from the concentrate through the membranes, as the concentrate flows in the reverse flow direction.

330
Circulating, via the circulation pump, the concentrate back from the first port to the second port in the reverse flow direction.

Figure 6C:
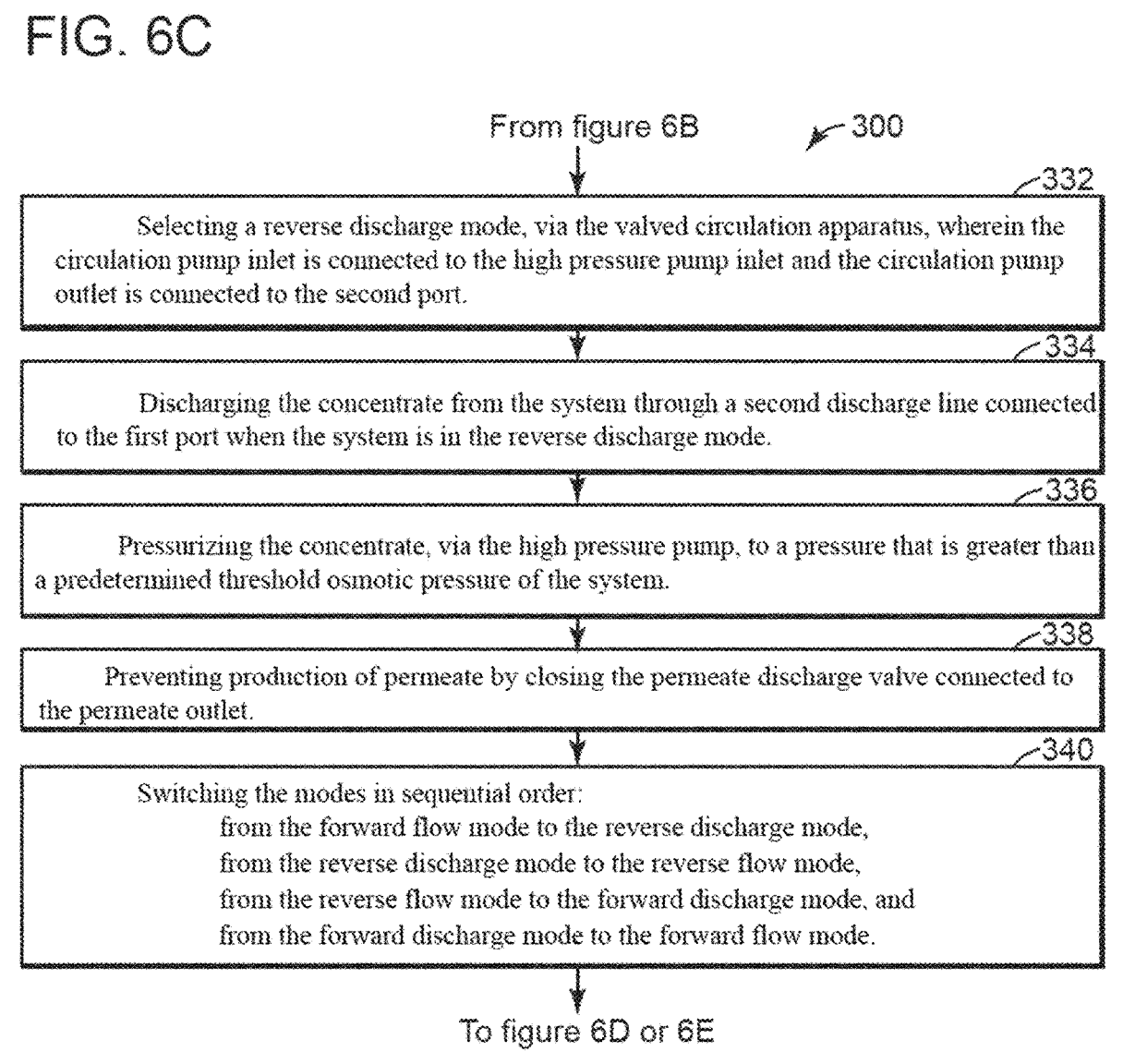

From figure 6B ⟋300

┌─────────────────────────────────────────────────────────────────────── ⟋332
│ Selecting a reverse discharge mode, via the valved circulation apparatus, wherein the
│ circulation pump inlet is connected to the high pressure pump inlet and the circulation pump
│ outlet is connected to the second port.
└───────────────────────────────────────────────────────────────────────

┌─────────────────────────────────────────────────────────────────────── ⟋334
│ Discharging the concentrate from the system through a second discharge line connected
│ to the first port when the system is in the reverse discharge mode.
└───────────────────────────────────────────────────────────────────────

┌─────────────────────────────────────────────────────────────────────── ⟋336
│ Pressurizing the concentrate, via the high pressure pump, to a pressure that is greater than
│ a predetermined threshold osmotic pressure of the system.
└───────────────────────────────────────────────────────────────────────

┌─────────────────────────────────────────────────────────────────────── ⟋338
│ Preventing production of permeate by closing the permeate discharge valve connected to
│ the permeate outlet.
└───────────────────────────────────────────────────────────────────────

┌─────────────────────────────────────────────────────────────────────── ⟋340
│ Switching the modes in sequential order:
│        from the forward flow mode to the reverse discharge mode,
│        from the reverse discharge mode to the reverse flow mode,
│        from the reverse flow mode to the forward discharge mode, and
│        from the forward discharge mode to the forward flow mode.
└───────────────────────────────────────────────────────────────────────

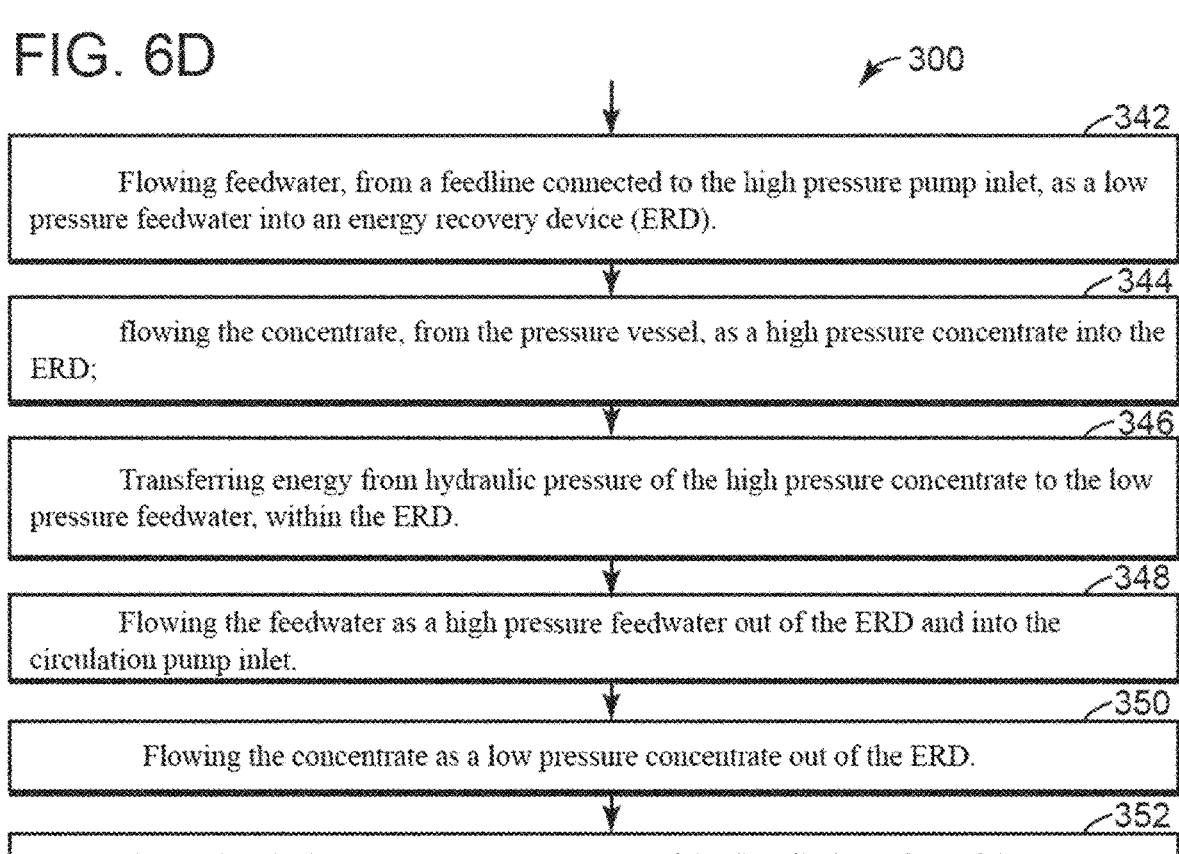

↗300

342

Flowing feedwater, from a feedline connected to the high pressure pump inlet, as a low pressure feedwater into an energy recovery device (ERD).

344 flowing the concentrate, from the pressure vessel, as a high pressure concentrate into the ERD;

346

Transferring energy from hydraulic pressure of the high pressure concentrate to the low pressure feedwater, within the ERD.

348

Flowing the feedwater as a high pressure feedwater out of the ERD and into the circulation pump inlet.

350

Flowing the concentrate as a low pressure concentrate out of the ERD.

352

Discharging the low pressure concentrate out of the first discharge line of the system.

FIG. 6E

From figure 6C     ↗300

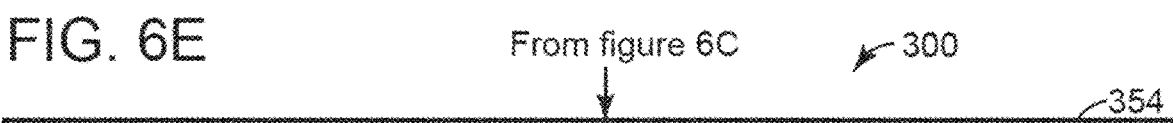

354

Positioning a first orifice in the first discharge line, wherein the first orifice is sized to provide a first predetermined pressure drop in the first discharge line that reduces pressure fluctuations caused by switching from the forward or reverse flow mode to the forward discharge mode.

356

Positioning a second orifice in the second discharge line, wherein the second orifice is sized to provide a second predetermined pressure drop in the second discharge line that reduces pressure fluctuations caused by switching from the forward or reverse flow mode to the reverse discharge mode.

REVERSE OSMOSIS METHODS

CROSS REFERENCE TO RELATED APPLICATIONS

This application is a divisional of, and claims the benefit of, U.S. patent application Ser. No. 19/184,453, filed Apr. 21, 2025, which is a continuation of, and claims the benefit of, PCT Patent Application PCT/IB2025/050384, filed Jan. 13, 2025; which is a continuation-in-part of, and claims the benefit of, PCT Patent Application PCT/IB2024/056735, filed Jul. 10, 2024. The contents of the prior patent applications are hereby incorporated by reference herein in their entirety.

TECHNICAL FIELD

The present disclosure relates to reverse osmosis systems and methods. More specifically, the disclosure relates to reverse osmosis systems having at least a forward flow mode and a discharge mode of operation.

BACKGROUND

Reverse osmosis is a process, often used to purify water, that uses one or more semi-permeable membranes to separate permeate molecules, such as water molecules, from other dissolved solids, such as salts. Reverse osmosis applies pressure to overcome osmotic pressure that favors even distribution of salts in solution. Below the osmotic pressure, no permeate will flow through the membranes.

Referring to prior art FIG. 1, a conventional reverse osmosis ("RO") system 10 typically has two stages 12, 14 with about half as many pressure vessels (or membrane housings) 16 in the second stage 14 compared to the first stage 12. Each pressure vessel 16 may contain about six membrane modules 13. Each membrane module 13 contains one or more semi-permeable membranes 15. Within each pressure vessel 16, feedwater 18 flows from membrane module to membrane module with the dissolved solids in the feedwater 18 becoming gradually more concentrated as about 15% of the water entering each membrane module 13 may be forced through the thin film membrane 15 as permeate 20. The feedwater 18 with concentrated dissolved solids, which exits the pressure vessels 16, is often referred to as "concentrate" or "brine" 24.

The high pressure pump 22 supplies high pressure feedwater 18 to the pressure vessels 16 to force pure water as permeate 20 through the membranes 15, leaving dissolved solids on the concentrate side of the membranes 15. Permeate 20 is collected from each pressure vessel 16 and concentrate 24 is bled out through a flow regulator valve 26 to limit the buildup of salts (dissolved solids) to a level close to but lower than the saturation level. When the concentration of salts in the concentrate exceeds the saturation level, the salts start to precipitate out, which may clog the membranes. Therefore care must be taken to not exceed the saturation concentration level of the salts. Problematically however, each of the various salts in the concentrate will have a distinct saturation level, so the critical salt must be identified and carefully controlled. For at least this reason, conventional reverse osmosis systems are operated at constant output and temporarily shut down when the product storage tank for receiving the produced permeate is full. The fraction of the feedwater that is produced as permeate is referred to as the recovery of the system. Given the cost of pretreatment of the feedwater, and disposal of the concentrate, the level of recovery is critically important.

Problematically also, the reverse osmosis system 10 must continuously feed high pressure water with dissolved salts to the membrane modules in the vessels 16, which is separated into a permeate 20 stream and a concentrate stream 24. This requires automatic control of the flow of concentrate 24 to drain if the system is to maintain efficiency under changing characteristics of the feedwater.

Also problematically, under constant output conditions, biological growth builds up on the membranes 15 of the membrane modules 13 and dissolved solids may become saturated and build up on the concentrate side of the membranes 15 of the membrane modules 13 within the pressure vessels 16. This requires the system to be periodically shut down for extended periods of time in order to chemically clean-in-place the membrane modules 13.

Also problematically, in conventional RO systems such as system 10, the maximum salt concentration will be present in the last membrane module 13 in the pressure vessels 16 of the last stage 14. Because the system 10 operates in a steady state, the saturation concentration of the least soluble salt must not be exceeded to avoid precipitation and clogging of the membranes 15 of that last membrane module 13.

As mentioned earlier, osmotic pressure is the minimum pressure required for water to permeate through a reverse osmosis membrane, and it increases with increasing salinity. Permeate 20 flow (flux) increases in proportion to how much the pressure in the concentrate exceeds the osmotic pressure. Problematically however, in conventional RO systems 10, the salinity doubles in the first stage 12 and then doubles again in the second stage 14, so the flux is substantially higher in the first membrane module 13 in the pressure vessels 16 of the first stage 12 than in the last membrane module 13 in the pressure vessels 16 of the last stage 14. The membrane modules 13 have an upper limit to the flux, so the membrane modules 13 after the first membrane module 13 are progressively less able to use their full flux capacity.

Referring to prior art FIG. 2A, a closed circuit reverse osmosis ("CCRO") system 30 is depicted as an alternative to the conventional reverse osmosis system 10 of FIG. 1. The CCRO system 30 adds a circulation pump 32 to recirculate the concentrate 24 to the inlet 34 of the pressure vessel 16. The high pressure pump 22 maintains the pressure in the system 30 and makes up for the water 20 that permeates out of the system 30. Periodically (for example, about every 10 minutes for about 1 minute) the exit valve 36 is opened and the concentrate 24 is purged from the system 30 by the high pressure pump 22 injecting fresh feedwater to displace the concentrate. The main advantages of the CCRO system 30 over the conventional RO system 20 are higher recovery (less concentrate to waste) and avoidance of much of the biological growth in the membrane modules due to the variations in dissolved salts. Another advantage of the CCRO system 30 is that the recirculation allows high recovery in a single stage.

Problematically however, the CCRO system 30 takes a substantial amount of time to discharge the concentrate 24 from the system using the high pressure pump 22. This is because the high pressure pump 22 is designed for high pressure and moderate flow, whereas concentrate discharge is more efficient under low pressure and high flow conditions.

To mitigate this problem, CCRO systems keep the system 30 at high pressure with the high pressure pump 22, continuously producing permeate 20, even while the concentrate 24 is discharging. Discharging at high pressure (for example up to 20 bar) involves a substantial amount of energy loss, is inefficient and, therefore, is more expensive than discharging at lower pressures (for example, under 2 bar).

Moreover, because permeate is produced even while the system is purging the concentrate, the water leaving the pressure vessel at the end of the discharge cycle is partially concentrated and the membrane modules closest to the concentrate outlet never receive the full benefit of exposure to fresh feedwater, which could otherwise redissolve crystal seeds on the membrane surface.

Also problematically, because the high pressure pump 22 is designed for high pressure and moderate flow, the high pressure pump 22 usually cannot achieve the maximum inflow permitted by the membrane modules 13 during discharge of the concentrate 24, which also increases the time required to purge the system 30.

Referring to prior art FIG. 2B, a flow reversal reverse osmosis (FRRO) system 40 is depicted as another alternative to the conventional reverse osmosis system 10 of FIG. 1. The FRRO system is similar to conventional RO systems 10 in that it requires at least 2 stages to attain good recovery and concentrate 24 is continuously discharged through a flow regulating valve 26. Each pressure vessel 16 in FIG. 1 may represent one or more pressure vessels and is referred to in FRRO systems as a block. Each block has an equal or nearly equal numbers of pressure vessels. Periodically (for example, about every 30 minutes) the flow direction through the pressure vessels 16 is switched and the block that was acting as the second stage is switched to become one of the two first stage blocks. In other words, each block takes a turn at being the block that functions as the second stage of the system 40. The main advantages of the FRRO system 40 over the conventional RO system 10 are the same as for CCRO system 30, i.e., higher recovery and avoidance of much of the biological growth in the membrane modules 13 due to the variations in dissolved salts. However, different from the CCRO system 30, the FRRO system 40 does not allow high recovery in a single stage. Problematically, the FRRO system 40 requires complex piping and valving for block switching.

Accordingly, there is a need for a reverse osmosis system that can discharge at lower pressures and higher flows, and in less time than conventional CCRO systems. Also, there is a need for a more energy efficient reverse osmosis system. Additionally, there is a need for a reverse osmosis system that can more effectively avoid membrane fouling by biological growth and salt precipitation without overly complex flow switching.

BRIEF DESCRIPTION OF THE INVENTION

The present disclosure offers advantages and alternatives over the prior art by providing a reverse osmosis system having at least a forward flow mode and a discharge mode. In the forward flow mode, feedwater and recirculated concentrate flow in a forward flow direction from a first port to a second port of a pressure vessel of the system. In the forward flow mode, a circulation pump of the system is connected across the pressure vessel to circulate the concentrate from the second port back to the first port.

In the discharge mode, the circulation pump inlet is connected, via a valved circulation apparatus, to the high pressure pump inlet instead of the second port of the pressure vessel and the circulation pump outlet is connected to the first port, in order to discharge the concentrate out of the second port of the pressure vessel. During discharge mode the speed of the high-pressure pump may be reduced, and the speed of the circulation pump may be increased so that the two pumps can operate in parallel, with matching discharge pressures. Thus, discharge of the concentrate can be achieved more energy efficiently and more rapidly than conventional CCRO systems.

In some embodiments, the reverse osmosis system of the present disclosure may also include a reverse flow mode. In the reverse flow mode, concentrate flows in a reverse flow direction from the second port to the first port of the pressure vessel. The first and second ports alternate in function between serving as inlet to the pressure vessel and concentrate outlet from the pressure vessel. The forward flow mode and the reverse flow mode together constitute the permeate production mode. The combination of the forward flow mode, discharge mode and reverse flow mode substantially reduces biological growth and precipitated salt build up, as well as increasing the recovery relative to conventional RO, FRRO and CCRO systems.

A reverse osmosis system in accordance with one or more aspects of the present disclosure includes a pressure vessel. The pressure vessel includes a first port, a second port and a permeate outlet. One or more membrane modules are disposed in the pressure vessel. Each membrane module has one or more membranes disposed therein. The membranes are configured to permeate water, via reverse osmosis, as a permeate from a concentrate flowing between the first and second ports. The membranes are also configured to block permeation of dissolved solids from concentrate. The pressure vessel is configured to flow the permeate out the permeate outlet. A high pressure pump is configured to pressurize feedwater to make up for permeate outflow. The high pressure pump includes a high pressure pump inlet through which the feedwater is supplied and a high pressure pump outlet. A circulation pump is configured to circulate the concentrate between the first and second ports. The circulation pump includes a circulation pump inlet and a circulation pump outlet. A valved circulation apparatus is configured to select between a forward flow mode of the system and a discharge mode of the system. In the forward flow mode, the circulation pump inlet is connected to the second port and the circulation pump outlet is connected to the first port, such that the circulation pump is configured to circulate the concentrate in a forward flow closed circuit path. In the discharge mode, the circulation pump inlet is connected to the high pressure pump inlet and the circulation pump outlet is connected to the first port, such that the circulation pump is configured to be able to discharge the concentrate from the system through a discharge line in parallel with the high pressure pump. In the discharge mode, the concentrate pressure may be greater than a predetermined threshold osmotic pressure of the system to reduce fatigue in the membrane modules, in which case a permeate discharge valve connected to the permeate outlet is closed to prevent permeate production.

Another reverse osmosis system in accordance with one or more aspects of the present disclosure includes a pressure vessel. The pressure vessel includes a first port, a second port and a permeate outlet. One or more membrane modules are disposed in the pressure vessel. Each membrane module has one or more membranes disposed therein. The membranes are configured to permeate water, via reverse osmosis, as a permeate from a concentrate flowing between the first and second ports. The membranes are also configured to block permeation of dissolved solids from the concentrate. The pressure vessel is configured to flow the permeate out the permeate outlet. A high pressure pump is configured to pressurize feedwater to be added to the circulating concentrate, making up for permeate outflow. The high pressure pump includes a high pressure pump inlet through which the feedwater is supplied and a high pressure pump outlet. A circulation pump is configured to circulate the concentrate between the first and second ports. The circulation pump includes a circulation pump inlet and a circulation pump outlet. A valved circulation apparatus is configured to select between a forward flow mode of the system, a forward discharge mode of the system, a reverse discharge mode of the system and a reverse flow mode of the system. In the forward flow mode, the circulation pump inlet is connected to the second port and the circulation pump outlet is connected to the first port, such that the circulation pump is configured to circulate the concentrate in a forward flow closed circuit path. In the forward and reverse discharge modes, the circulation pump inlet is connected to the high pressure pump inlet so that it can work in parallel with the high pressure pump to displace the concentrate more quickly from the membrane modules. In the forward discharge mode, the high pressure pump outlet and the circulation pump outlet are connected to the first port and concentrate flows in the forward flow direction to be discharged from the second port through a discharge line In the optional reverse discharge mode, the high pressure pump outlet and the circulation pump outlet are connected to the second port and concentrate flows in the reverse flow direction to be discharged from the first port through a discharge line. In the reverse flow mode, the circulation pump inlet is connected to the first port and the circulation pump outlet is connected to the second port, such that the circulation pump is configured to circulate the concentrate in a reverse flow closed circuit path. When the reverse discharge mode is implemented, concentrate flow is inverted after each closed circuit mode, so that after both forward and reverse closed flow, the membrane module exposed to the highest dissolved salts immediately receives fresh feed water, reducing the possibility of salt precipitation and membrane fouling. In either discharge mode, the concentrate pressure may be greater than a predetermined threshold osmotic pressure of the system to reduce fatigue in the membrane modules, in which case a permeate discharge valve connected to the permeate outlet is closed to prevent permeate production.

A method of reverse osmosis in accordance with one or more aspects of the present disclosure includes selecting a forward flow mode of a reverse osmosis system, via a valved circulation apparatus of the system, wherein a circulation pump outlet of a circulation pump of the system is connected to a first port of a pressure vessel of the system and a circulation pump inlet of the circulation pump is connected to a second port of the pressure vessel. Concentrate is pressurized, via a high pressure pump of the system, to flow through the pressure vessel in a forward flow direction from the first port to the second port. Water is permeated from the concentrate, via reverse osmosis, through one or more membranes of one or more membrane modules disposed in the pressure vessel, as the concentrate flows in the forward flow direction. The water is directed to flow as a permeate out of a permeate outlet of the pressure vessel. Permeation of dissolved solids from the concentrate through the membranes is blocked, as the concentrate flows in the forward flow direction. The concentrate is circulated, via the circulation pump, back from the second port to the first port in a forward flow closed circuit path. A discharge mode of the system is selected, via the valved circulation apparatus, wherein the circulation pump inlet is connected to a high pressure pump inlet of the high pressure pump and the circulation pump outlet is connected to the first port. The concentrate flowing from the second port is discharged out of the system, impelled by feedwater entering through the high pressure pump and the circulation pump, when the system is in the forward and reverse discharge mode. The production of permeate out of the permeate outlet is prevented during the discharge mode of the system.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

DRAWINGS

The disclosure will be more fully understood from the following detailed description taken in conjunction with the accompanying drawings, in which:

Figure 1:
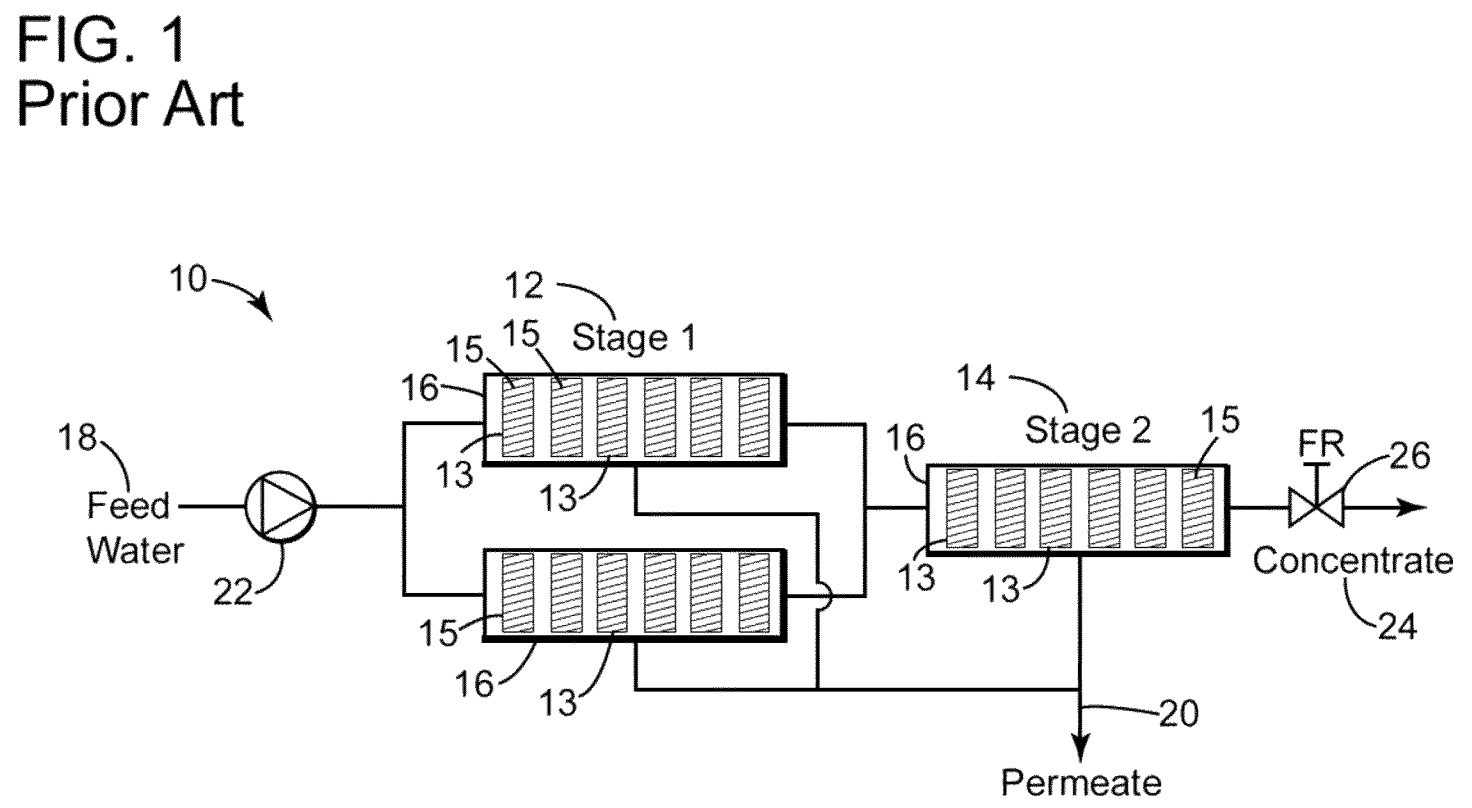

FIG. 1 depicts an example of a schematic of a prior art conventional reverse osmosis system;

FIG. 3A depicts an example of a schematic of a reverse osmosis system in a forward flow mode, according to aspects described herein;

FIG. 3B depicts an example of a schematic of the reverse osmosis system of FIG. 3A in a discharge mode, according to aspects described herein;

FIG. 3C depicts an example of a schematic of the reverse osmosis system of FIG. 3A with an energy recovery device included, during the discharge mode, according to aspects described herein;

FIG. 3D depicts an example of a schematic of the reverse osmosis system of FIG. 3A with an orifice plate included, during the discharge mode, according to aspects described herein;

FIG. 5C depicts an example of a schematic of the reverse osmosis system of FIG. 5A in a reverse flow mode, according to aspects described herein;

FIG. 5D depicts an example of a schematic of the reverse osmosis system of FIG. 5A in a reverse discharge mode, according to aspects described herein;

FIG. 5E depicts an example of a schematic of the reverse osmosis system of FIG. 5A with an energy recovery device included, during the forward discharge mode, according to aspects described herein;

FIG. 5F depicts an example of a schematic of the reverse osmosis system of FIG. 5A with an energy recovery device included, during the reverse discharge mode, according to aspects described herein;

FIG. 5G depicts an example of a schematic of the reverse osmosis system of FIG. 5A with orifice plates included, during the forward discharge mode, according to aspects described herein;

FIG. 5H depicts an example of a schematic of the reverse osmosis system of FIG. 5A with orifice plates included, during the reverse discharge mode, according to aspects described herein;

FIG. 6A depicts an example of a flow diagram of a method of reverse osmosis, according to aspects described herein;

FIG. 6B depicts an example of a flow diagram of a continuation of the method of reverse osmosis of FIG. 6A, according to aspects described herein;

FIG. 6C depicts an example of a flow diagram of a continuation of the method of reverse osmosis of FIGS. 6A and 6B;

FIG. 6D depicts an example of a flow diagram of a continuation of the method of reverse osmosis of FIGS. 6A, 6B and 6C; and FIG. 6E depicts an example of a flow diagram of an alternative continuation of the method of reverse osmosis of FIGS. 6A, 6B and 6C.

DETAILED DESCRIPTION

Figure 2:
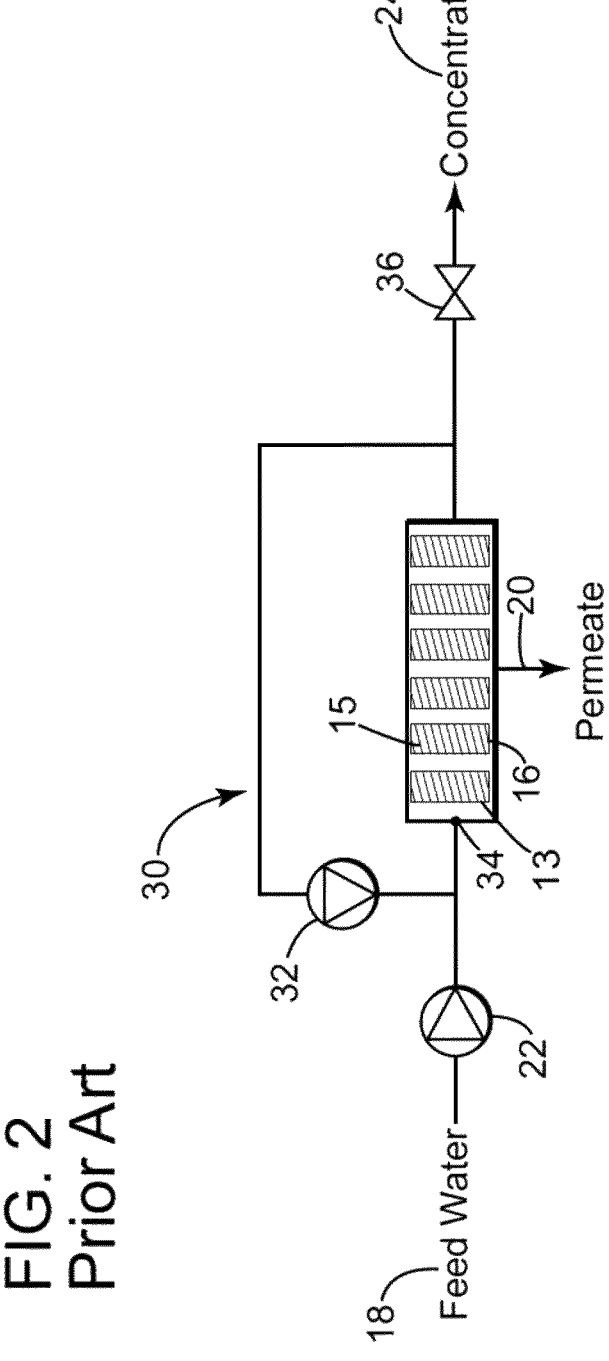
FIG. 2 depicts an example of a schematic of a prior art closed circuit reverse osmosis (CCRO) system.
Figure 2B:
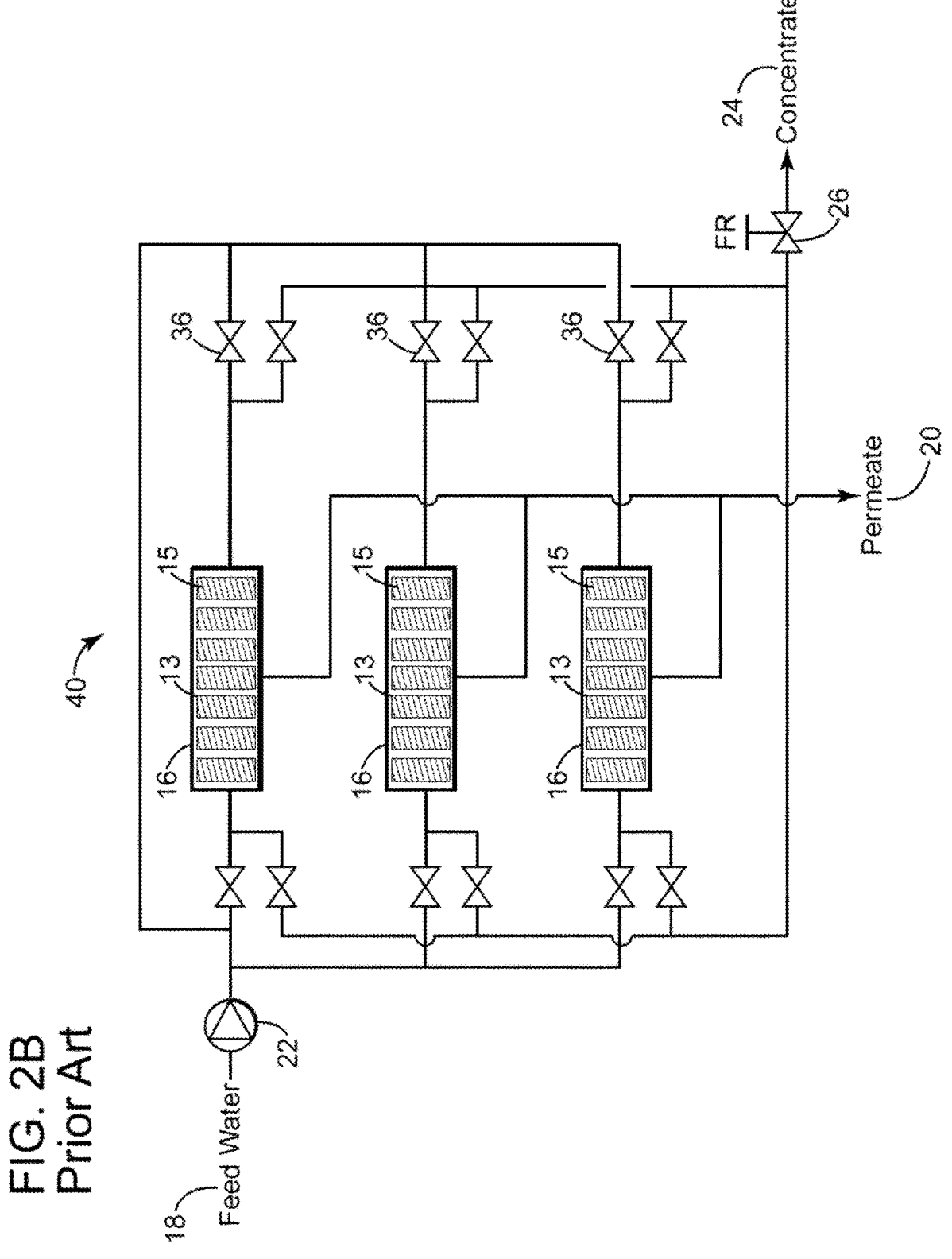
FIG. 2B depicts an example of a schematic of a prior art flow reversal reverse osmosis (FRRO) system.

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms "significantly", "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 3A:
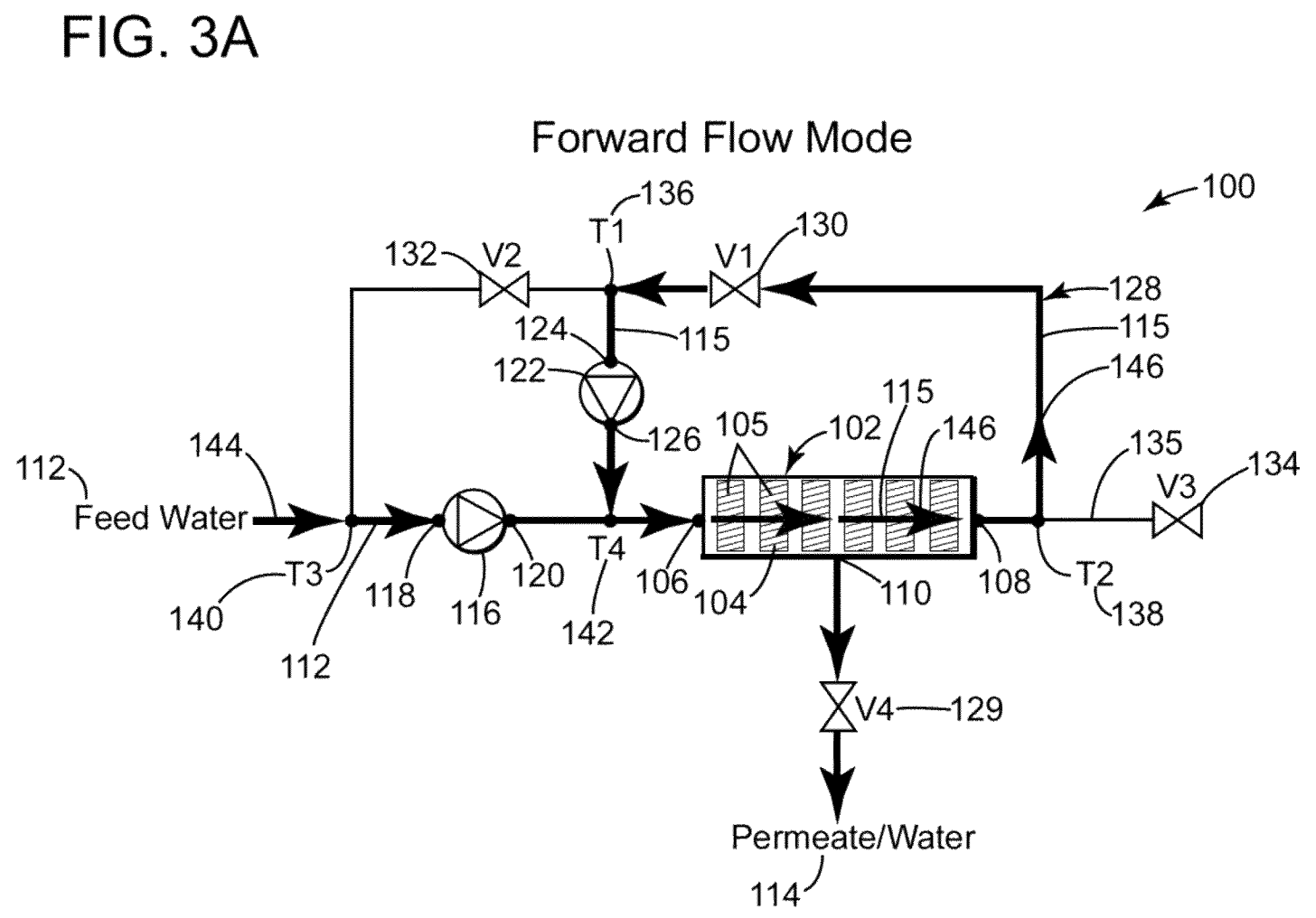
Figure 3B:
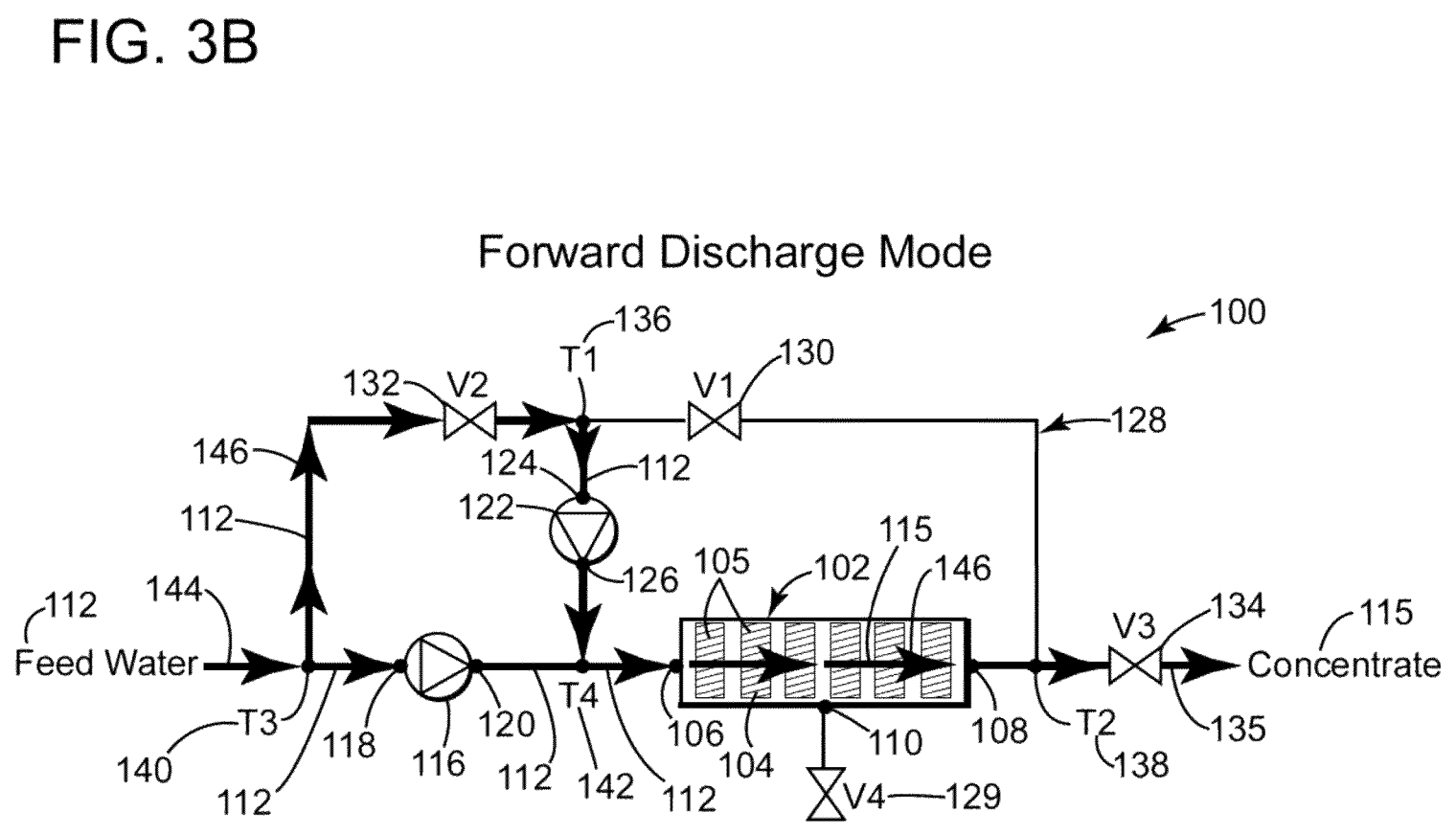

Referring to FIGS. 3A and 3B, an example is depicted of a schematic of a reverse osmosis system 100 in a forward flow mode (FIG. 3A) and a discharge mode (FIG. 3B), according to aspects described herein. The system 100 is a novel type of closed circuit reverse osmosis (CCRO) system. The reverse osmosis system 100 includes a pressure vessel 102. The pressure vessel 102 includes a first port 106, a second port 108 and a permeate outlet 110. One or more membrane modules 104 are disposed in the pressure vessel. Each membrane module 104 has one or more membranes 105 disposed therein. The one or more membranes 105 are configured to permeate water 114, via reverse osmosis, as a permeate 114 from a concentrate 115 flowing through the first and second ports 106, 108. The membranes 105 are also configured to block permeation of dissolved solids (not shown) from the concentrate 115. The pressure vessel 102 is configured to flow the water 114 as a permeate 114 out the permeate outlet 110.

The system 100 also includes a high pressure pump 116 and a circulation pump 122. The high pressure pump 116 is configured to pressurize feedwater 112 to be added to the concentrate 115. The high pressure pump 116 includes a high pressure pump inlet 118 through which the feedwater 112 is supplied and a high pressure pump outlet 120. The circulation pump 122 is configured to circulate the concentrate 115 between the first and second ports 106, 108. The circulation pump includes a circulation pump inlet 124 and a circulation pump outlet 126.

A valved circulation apparatus 128 may be configured to select between a forward flow mode of the system 100 and a discharge mode of the system 100. In the forward flow mode, the circulation pump inlet 124 is connected to the second port 108 and the circulation pump outlet 126 is connected to the first port 106. In the forward discharge mode, the circulation pump inlet 124 is connected to the high pressure pump inlet 118 and the circulation pump outlet 126 is connected to the first port 106.

However, as exemplified and explained in greater detail with reference to FIG. 5D, the valved circulation apparatus 128 may be configured to select an optional reverse flow mode and an optional reverse discharge mode. In the reverse flow mode, the circulation pump inlet 124 is connected to the first port 106 and the circulation pump outlet 126 is connected to the second port 108. In reverse discharge mode, the circulation pump inlet 124 is connected to the high pressure pump inlet 118 and the circulation pump outlet 126 is connected to the second port 106. When the reverse flow mode and the reverse discharge mode are included, the valved circulation apparatus 128 may advantageously be configured to cycle in sequential order from the forward flow mode, then to the reverse discharge mode, then to the reverse flow mode, then to the forward discharge mode and then back to the forward flow mode to repeat the cycle. This has the added benefit of immediately introducing fresh feedwater to the membrane module that was exposed to the highest salinity during the forward and reverse flow modes, thereby arresting incipient scaling every time the flow direction is switched between a forward flow direction (from the first port 106 to the second port 108 of the pressure vessel 102) and a reverse flow direction (from the second port 108 to the first port 106 of the pressure vessel 102).

As used herein, the term "feedwater" 112 is the flow of solution of water (as the solvent of the solution) and dissolved solids (as the solute of the solution) that enters the reverse osmosis system 100, but has not yet been subjected to the process of reverse osmosis, i.e., has not yet entered the pressure vessel 102 where reverse osmosis occurs. By way of example, the feedwater 112 may be brackish water or sea water.

Also as used herein, the term "concentrate" 115 is the flow of a solution of water that has become more concentrated with dissolved solids than the fresh feedwater 112 that first enters the system 100. This is because the concentrate 115 has been subjected to the process of reverse osmosis, wherein pure water 114 as a permeate 114 is removed from the fresh feedwater 112. Therefore, the concentration of dissolved solids in the concentrate increases over the time the concentrate is subjected to the reverse osmosis process. Accordingly, the term concentrate is used herein to describe the flow of the solution of water passing through the pressure vessel 102 on the high pressure side of the membrane.

Also as used herein, the term "connected" between two components of the system 100 means that the components are in fluid communication with each other. Therefore, a fluid flow path is established between the components and any valve (for example) in that flow path would be open to allow flow of the fluid (e.g., permeate, concentrate or feedwater) of the system therethrough. So, for example, when the inlet 124 of the circulation pump 122 is said to be connected to the second port 108 of the pressure vessel 102, then the valve 130 is open to allow concentrate flow through the lines connecting the circulation pump inlet 124 to the second port 108.

The membranes 105 (see FIG. 4A) in the membrane modules 104 of FIGS. 3A and 3B may be semi-permeable membranes that are designed to act as a barrier to salts and other dissolved solids, but allow water molecules to pass or permeate through the membrane 105 as permeate 114. During reverse osmosis, the water molecules in feedwater 112, such as brackish water or sea water, will pass through the membrane 105 when subjected to pressure, but the dissolved solids will remain in the concentrate 112 on the high pressure side of the membrane 105. Each membrane 105 may be housed in a membrane module 104 (see FIG. 4A). Each membrane module 104 would be disposed in the pressure vessel 102. Each membrane module 104 is configured to provide the mechanism that separates the concentrate into a permeate 114 stream and a concentrate 112 stream. The permeate 114 stream flows out of the permeate outlet 110 of the pressure vessel 102 and the concentrate stream 113 (sometimes called a "concentrated feedwater stream") flows out of the second port 108 of the pressure vessel 102.

The high pressure pump 116 is configured to pressurize the feedwater 112 and, therefore, the concentrate 115. For example, operating pressure is typically in a range of 10-20 bar for brackish water and typically in a range of 45-70 bar for seawater. The high pressure pump 116 includes the high pressure pump inlet 118 through which the feedwater 112 is supplied and the high pressure pump outlet 120. The outlet 120 of the high pressure pump 116 may be connected to the first port 106, as exemplified in FIGS. 3A and 3B. However, as exemplified in FIGS. 5A and 5C, the connection of the outlet 120 of the high pressure pump 116 may be switchable, via the valved circulation apparatus 128, between the first port 106 and the second port 108. The high pressure pump 116 may have a variable frequency drive to adjust flow and pressure.

The circulation pump 122 is configured to circulate the concentrate 115 between the first and second ports 106, 108. The circulation pump 122 only needs to overcome the pressure drop through a feed spacer mesh 152, which is disposed adjacent to the membranes 105 (see FIG. 4A) and on the concentrate side of the membranes 105. For example, the operating pressure of the circulation pump 122 may only be in a range of 0.5 to 1.5 bar. The circulation pump 122 would have a relatively high flow compared to the high pressure pump 116 (for example twice the flow) in order to create eddies (e.g., turbulent flow) in the mesh 152 and thereby reduce concentration gradient (polarization) between the bulk flow and the surface of the membrane 105, and the tendency for biological growth on the membranes 105. The eddies also enhance the rate of permeate flow through the membranes 105. The circulation pump 122 includes the circulation pump inlet 124 and the circulation pump outlet 126. The circulation pump 122 may have a variable frequency drive to adjust flow and pressure.

The valved circulation apparatus 128 is configured to select between a forward flow mode (FIG. 3A) of the system

100 and a discharge mode (FIG. 3B) of the system 100. In the forward flow mode (FIG. 3A), the circulation pump inlet 124 is connected to the second port 108 and the circulation pump outlet 126 is connected to the first port 106, such that the circulation pump 122 is configured to circulate the concentrate 115 in a forward flow direction from the first port 106 to the second port 108.

In the forward discharge mode (FIG. 3B), the circulation pump inlet 124 is connected to the high pressure pump inlet 118 and the circulation pump outlet 126 is connected to the first port 106, such that the circulation pump 122 is configured to discharge the concentrate 115 from the system 100 through a first discharge line 135 connected to the second port 108.

During the forward discharge mode, a high pressure pump outlet pressure may be maintained to be greater than a predetermined threshold osmotic pressure of the system 100. Normally, maintaining the high pressure pump 116 outlet pressure above the threshold osmotic pressure would result in permeate 114 being produced through the permeate outlet 110 of the pressure vessel 102. However, a permeate discharge valve 129, which is connected to the permeate outlet 110, is kept closed during the forward discharge mode to prevent permeate production though the permeate outlet 110. As will be explained in greater detail herein, preventing permeate production while maintaining a system pressure above the threshold osmotic pressure, provides significant performance advantages for the system 100, such as, for example, a significant increase in the quality of the permeate.

In the forward flow mode (FIG. 3A), the concentrate 115 flows through the pressure vessel 102 in a forward flow direction from the first port 106 to the second port 108 and the concentrate 115 circulates back to the first port 106 via the circulation pump 122. During the forward flow mode (FIG. 3A), the permeate discharge valve 129 (V4) is kept open and the system 100 produces permeate 114 through the permeate outlet 110.

The valved circulation apparatus 128 of the system 100 in FIGS. 3A and 3B may include the following structure. A first valve 130 is connected via a first tee 136 to the inlet 124 of the circulation pump 122. The first valve 130 is also connected via a second tee 138 to the second port 108 of the pressure vessel 102. A second valve 132, which may be unidirectional, is connected via the first tee 136 to the inlet 124 of the circulation pump 122. The second valve 132 is also connected via a third tee 140 to the inlet 118 of the high pressure pump 116. A third valve 134 is positioned in a discharge line 135 that is connected via the second tee 138 to the second port 108 of the pressure vessel 102. The circulation pump outlet 126 and the high pressure pump outlet 120 are connected via a fourth tee 142 to the first port 106 of the pressure vessel 102. A fourth valve (or permeate discharge valve) 129 is connected to the permeate outlet 110. Finally, a feed line 144 for supplying the feedwater 112 is connected to the third tee 140.

The valves (such as the first, second, third and fourth valves 130, 132, 134 and 129) and tees (such as the first, second, third and fourth tees 136, 138, 140 and 142) as used herein, may include stand-alone functioning valves and tees or may be internal components to more complicated flow control devices. For example, the first valve 130, second valve 132 and first tee 136 may comprise a single three-way valve that performs the same flow control functions.

Referring more specifically to FIG. 3A, during the forward flow mode (FIG. 3A), the first valve 130 and the permeate discharge valve 129 of the valved circulation apparatus 128 are open and the second and third valves 132, 134 are closed. The forward flow mode is configured to enable the high pressure pump 116 to pressurize the system 100 and to compensate for concentrate 115 lost during permeate production, i.e., to make up for the water that as permeate 114 flows out the permeate outlet 110 and, therefore, reduces the volume of concentrate 115. The forward flow mode is also configured to enable the circulation pump 122 to circulate the concentrate 115 back through the pressure vessel 102 in a forward flow direction by returning it from the second port 108 to the first port 106. In other words, as indicated by flow arrows 146, the concentrate 115 circulates from the second port 108, to the first valve 130, to the circulation pump 122 and back to the first port 106.

When the concentration of salts in the concentrate 115 exceeds the saturation level, these salts start to precipitate, which clogs the membranes 105 within the membrane modules 104. The time required to precipitate salts after their concentration has exceeded the saturation level is known as the induction time, which depends primarily on the degree to which the saturation level is exceeded. Accordingly, to prevent the precipitation of salts from the concentrate 115, the system 100 may switch to the forward discharge mode after a predetermined saturation level of the system 100 has been reached, and before an additional predetermined induction time of the system 100 has elapsed. Mode switching allows the system to exceed the saturation level within the limits of the induction time, thereby increasing the recovery, which is not possible in conventional RO systems.

CCRO systems 30, 100 may take advantage of the induction time using non-steady-state operation to obtain higher recovery, with less feedwater consumption and less concentrate to dispose of. Induction time, as mentioned above, is the time it takes for salts in a supersaturated solution to start to crystalize and precipitate, generally in the range of a few minutes. For example, the induction time may be 2 minutes, or 5 minutes or 10 minutes.

CCRO systems 30, 100 may do this by circulating the concentrate while producing permeate, thereby increasing the salinity past the saturation level. The prior art CCRO systems 30 will then discharge the concentrate before the induction time is exceeded using the high pressure pump. Problematically, with prior art system 30, there is relatively slow progression of the feedwater through the pressure vessel, due to the relatively moderate flow rate of the high pressure pump. Because the final membrane module of the pressure vessel will contain supersaturated concentrate until the fresh feedwater has travelled the length of the pressure vessel to reach it, the flush time reduces the useable induction time. System 100 advantageously mitigates this issue with the significantly higher flow rate of the circulation pump that is uniquely used during the discharge mode, which significantly reduces the time for the feedwater to reach the last membrane module.

Referring more specifically to FIG. 3B, during the forward discharge mode, the first valve 130 and the permeate discharge valve 129 are closed and the second and third valves 132, 134 are open to enable discharge of the concentrate 115 through the discharge line 135 and out the third valve 134 and to prevent permeate production out of the permeate outlet 110. The discharge mode is configured to enable the feedwater 112 to flow into the pressure vessel 102 from the first port 106 displacing the concentrate 115 out through the second port 108, to be discharged out of the first discharge line 135 of the system 100 through the third valve 134. In other words, as indicated by flow arrows 146, the feedwater 112 enters the high pressure pump inlet 118 and the circulation pump inlet 124 through the open second valve 132, and is pumped in parallel by the high-pressure pump 116 and the circulation pump 122, through the fourth tee 142, into the first port 106, wherein the feedwater 112 displaces the concentrate 115, which flows through the second port 108, through the third valve 134 and out of the system 100.

Also, during the forward discharge mode, the high pressure pump 116 outlet pressure may be maintained to be greater than the predetermined threshold osmotic pressure of the system 100. Additionally, the permeate discharge valve 129, which is connected to the permeate outlet 110, is kept closed during the forward discharge mode to prevent permeate production though the permeate outlet 110.

Advantageously, the net effect of blocking permeate production during the forward discharge mode (and during a reverse discharge mode as exemplified in FIG. 5D) is beneficial for the permeate quality. This is because at least two favorable conditions are achieved:

1. Greater stability in concentration during the permeate production phase (i.e., the forward flow mode:

By not producing permeate during the forward discharge mode, you avoid obtaining permeate under transient and less favorable conditions for quality. This ensures that when permeate production resumes (i.e., when switching back to the forward flow mode), the system 100 is at a more stable point with more controlled internal concentrations.

2. Lower dissolved solids load retained in the membranes after discharge:

A shorter discharge phase, using the entire feed flow, pushes the concentrate out of the system more efficiently, leaving fewer dissolved solids retained in the membranes. This reduces the risk of scaling and fouling, which in the medium term also contributes to better permeate quality by keeping the membranes in better operational condition.

Overall, these improvements in operational stability and the reduced residual load on the membranes translate into a more consistent and higher average permeate quality.

Also advantageously, the forward discharge mode is very energy efficient and rapid compared to conventional CCRO systems. Also advantageously, the high pressure pump 116 is available to provide additional flow that can combine with the circulation pump 122 flow for maximum allowable flow into the membrane modules 104 during discharge.

Also advantageously, the CCRO system 100 uniquely reduces the discharge time by using the circulation pump 122 to execute the discharge as well as the high-pressure pump 116, thereby making better use of the induction time. The principal function of the high-pressure pump 116 is to make up the water lost to permeate 114 production, which flow may be about ⅓ the maximum concentrate flow for the membrane modules 104. It would be inefficient and costly to size the high-pressure pump 116 to provide the maximum concentrate flow. The circulation pump 122 may be sized to attain this maximum flow in conjunction with the high pressure pump and is only required to provide the pressure lost to friction as the concentrate 115 circulates and is eventually discharged, so the circulation pump 122 can execute the discharge mode more efficiently than prior art CCRO systems.

Figure 3C:
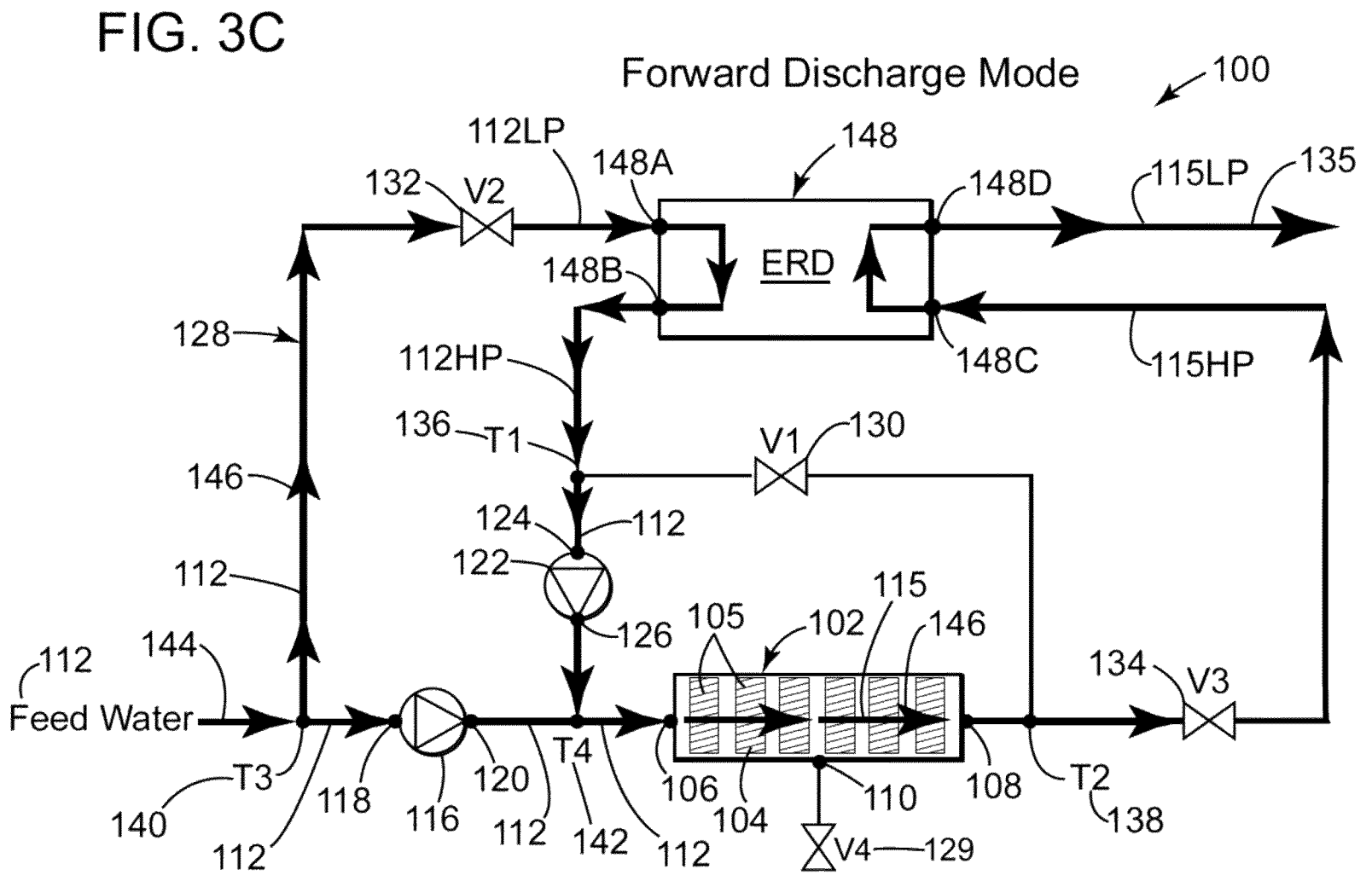

Referring to FIG. 3C, an example is depicted of a schematic of the reverse osmosis system 100 of FIG. 3A with an energy recovery device (ERD) 148 included, during the discharge mode, according to aspects described herein. Energy recovery devices, or pressure exchangers, are well known devices that transfer pressure energy from a high pressure fluid stream to a low pressure fluid stream. An example of at least one such ERD is manufactured under the trademark PX® Pressure Exchanger®, by Energy Recovery, Inc. of San Leandro, CA, USA.

During the forward discharge mode of system 100 of FIG. 3C (also during the reverse discharge mode of system 200 of FIG. 5D), the valved circulation apparatus 128 may be configured such that feedwater 112 from the feedline 144 enters feedwater input port 148A of the ERD 148 as low pressure feedwater 112LP, and concentrate 115 from the pressure vessel 102 enters concentrate input port 148C of the ERD 148 as high pressure concentrate 115HP. Energy from the hydraulic pressure of the high pressure concentrate 115HP is transferred from the high pressure concentrate 115HP to the low pressure feedwater 112LP within the ERD 148. Thereafter, the feedwater 112 exits feedwater output port 148B of the ERD 148 as high pressure feedwater 112HP and flows into the circulation pump inlet 124. Simultaneously, the concentrate 115 exits the concentrate output port 148D of the ERD 148 as low pressure concentrate 115LP, wherein it is discharged from the system 100 out of the discharge line 135.

Advantageously, by transferring the high pressure energy of the high pressure concentrate 115HP, that would otherwise be wasted, to the low pressure feedwater 112LP, the pressure fluctuations that the pressure vessel 102 and membrane modules 104 are exposed to when switching from the forward flow mode FIG. 3A to the discharge mode FIG. 3C are significantly reduced. As such, the material fatigue on the pressure vessel 102 and membrane modules 104 are also advantageously significantly reduced.

When energy is recovered from the concentrate 115, as in the forward discharge mode of system 100 of FIG. 3C, the concentrate pressure in the membrane modules may be above the osmotic pressure, so an additional valve 129 is included at the permeate outlet 110 to block the flow of permeate 114.

Advantageously, during the forward discharge mode, the system 100 does not produce permeate 114 out of the permeate port 110, because the permeate discharge valve 129 is in its closed configuration. Stopping permeate production during the discharge mode, even when operating above the osmotic threshold pressure of the system 100, has several advantages, some of which are explained in greater detail as follows:

Concentration Polarization: In reverse osmosis (RO) systems, as water passes through the membranes 105 (as permeate flux 114), salts and other solutes are left behind, causing their concentration to increase near the membrane surface. This phenomenon is known as concentration polarization.

Supersaturation and Fouling: If the concentration of salts near the surface of the membranes 105 exceeds their solubility limits, they can precipitate and form scale or fouling layers on the membranes 105. This reduces membrane efficiency and lifespan.

How Stopping Permeate Flow Helps:

Interrupting Concentration Polarization: By stopping permeate flow during the discharge phase (or mode), one effectively halts the movement of water 114 through the membrane 105. This interruption stops the buildup of salts at the membrane surface because there's no longer a driving force pushing water 114 through the membranes 105 and leaving salts behind.

Redissolving Solutes: Without the permeate flux 114, the high concentration of salts near the membranes 105 begins to diffuse back into the bulk solution (or concentrate 115). This can reduce the local supersaturation and allow any precipitated salts (seed crystals) to redissolve.

Utilizing Induction Time: Induction time is the period between reaching supersaturation and the onset of crystal nucleation and growth. By stopping the permeate flow, you can extend this induction time, delaying or preventing the formation of scale on the membrane surface.

Achieving Higher Recovery:

Higher Salt Concentrations Without Fouling: With reduced concentration polarization and delayed fouling, the system 300 can handle higher salt concentrations in the concentrate 115. This means you can recover more water 114 before reaching the limits imposed by scaling risks.

Optimizing the Discharge Phase: By modifying the discharge phase by stopping permeate flow, you enhance the system's ability to manage higher solute concentrations safely. Accordingly, stopping production of permeate 114 during the discharge mode interrupts the concentration polarization caused by flow of permeate 114 through the membranes 105, allowing even higher recoveries than prior art RO systems.

Reducing Discharge Time: Because none of the inflow during discharge is lost to permeate and all is used to displace concentrate from the membrane modules, the discharge time is reduced and more of the induction time can be dedicated to increasing recovery.

Figure 3D:
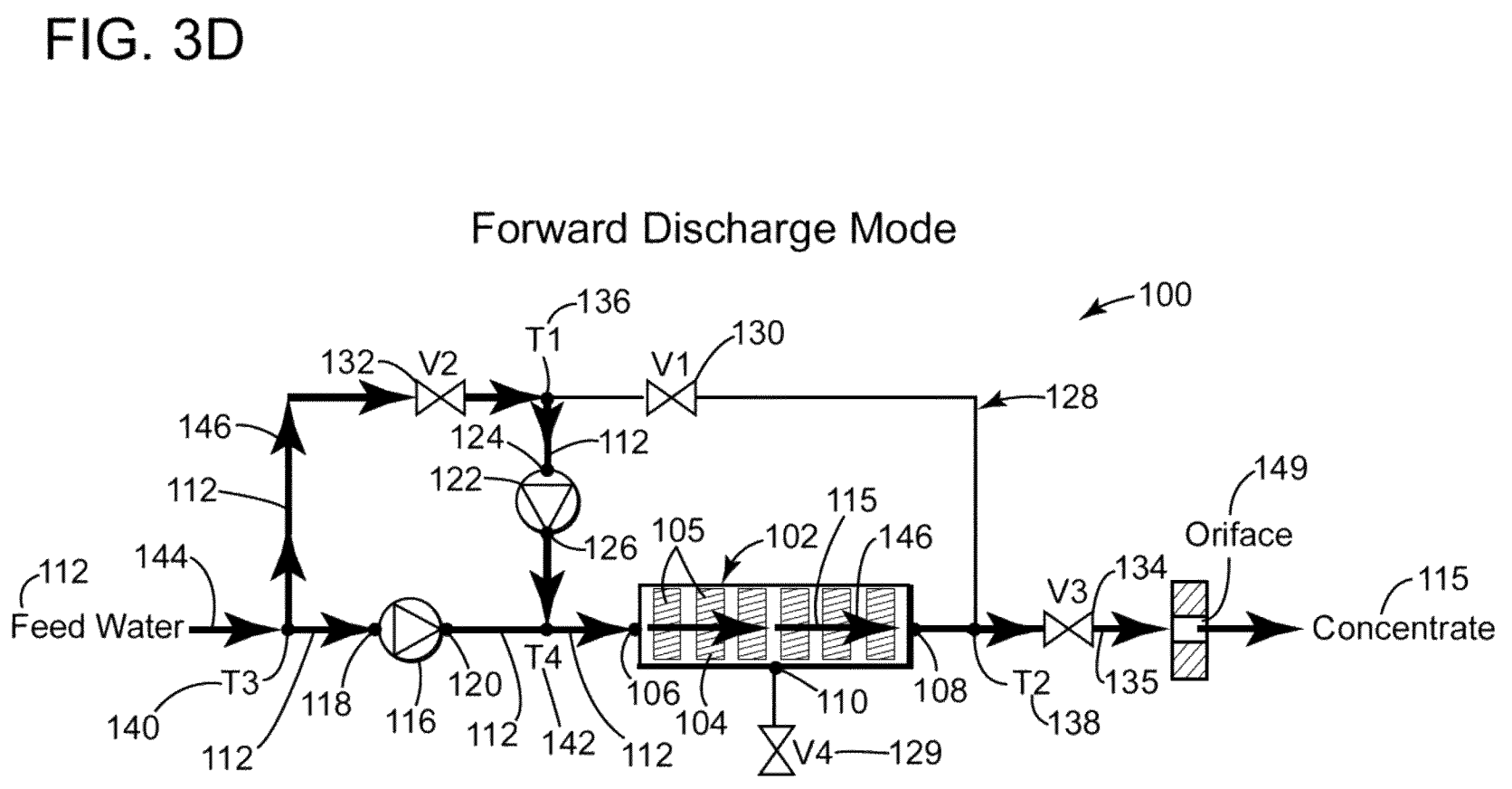

Referring to FIG. 3D, another embodiment of the system 100 is shown in its forward discharge mode, wherein the ERD 148 is replaced with an orifice 149 in the first discharge line 135 of the system 100. In some circumstances, such as for example, in reverse osmosis systems for brackish water wherein the operating pressures are significantly lower than reverse osmosis systems for seawater, the ERD may be replaced by an orifice 149.

In system 100, due to the permeate flow being stopped during the discharge mode, very high recoveries of permeate 114 are made possible. For example, recoveries in excess of 80 percent, 85 percent, 90 percent or 95 percent. As a result, the flow of concentrate 115 may be reduced to the extent that the amount of energy recoverable by an ERD 148 from this stream of concentrate 115 is not significant enough to be practical. The recoverable energy in some such cases may be less than 0.5% of the total energy input.

Another function of the ERD 148 is to avoid wide pressure fluctuations in the membrane modules 105 and possible fatigue caused by these fluctuations. However, reduction of these pressure fluctuations may also be achieved by positioning an orifice plate 149 in the discharge line 135. More specifically, the orifice 149 positioned in the discharge line 135 is sized to provide a predetermined pressure drop in the first discharge line 135 that reduces pressure fluctuations caused by switching from the forward flow mode to the discharge mode. The orifice (or orifice plate) 149 serves to keep the pressure fluctuations across the membrane modules 104 when switching from the forward (or reverse) flow mode to the discharge mode at a level that prevents fatigue. The orifice 149 may be a simple fixed size orifice in a plate. However, the orifice may also have a variable orifice size that can change to meet varying pressure drop conditions.

Moreover, the combination of a closed permeate discharge valve 129 and an orifice 149 is important and advantageous. This is because, in system 100, and in other Closed-Circuit Reverse Osmosis (CCRO) systems, controlling pressure and flow transitions during the discharge phase is critical due to the system's unique operating cycle. The concept of adding a permeate discharge valve (or blocking valve) 129 in the permeate outlet line 110 that closes during discharge, combined with an orifice plate 149 in the first discharge line (concentrate outlet line) 135, can offer several CCRO-specific benefits:

1. Protecting Membrane Integrity During Cycle Transitions: In CCRO systems like system 100, the system cycles between closed-circuit recirculation and periodic discharge of the concentrated brine. During the discharge step, abrupt depressurization can occur if flow paths open too quickly. A blocking valve 129 on the permeate outlet line 110 that closes at discharge prevents the permeate side from instantly dropping to atmospheric pressure. Simultaneously, an orifice plate 149 on the concentrate side provides a controlled pressure drop rather than a sudden release. This combination helps maintain more stable transmembrane pressures and reduces mechanical stress on the membranes, which is particularly important given CCRO's dynamic cycling nature.

2. Improved Cycle-to-Cycle Consistency: CCRO systems, like system 100, rely on controlled pressurization, recirculation, and discharge sequences for optimal performance and high recovery. By preventing abrupt pressure fluctuations on the permeate side (via the blocking valve 129) and regulating the discharge flow rate and pressure on the concentrate side (via the orifice plate 149), the system transitions through its cycle phases with greater predictability. This ensures a more consistent operating environment from cycle to cycle, improving overall operational reliability and performance.

3. Minimized Reverse Flow and Scaling Risks: In CCRO system 100, the membrane elements 105 operate at high recovery with concentrated brine recirculating in a closed loop until discharge. Preventing backflow of permeate into the membranes 105 at the moment of discharge is crucial for maintaining water quality and membrane cleanliness. The blocking valve 129 ensures no reverse permeate flow and reduces the likelihood of re-entraining concentrate into the permeate side. Coupled with the orifice plate's 149 controlled depressurization, this reduces the potential for sudden mixing, scaling, or fouling events, which are critical concerns in high-recovery, intensively managed CCRO cycles.

4. Extended Membrane Life in a High-Intensity Environment: CCRO subjects membranes 105 to higher recoveries and more frequent pressure changes compared to conventional RO. The smoother, more controlled transitions afforded by the blocking valve 129-orifice plate 149 combination help mitigate membrane fatigue. Over time, this can lead to less frequent replacement, reduced downtime, and lower overall maintenance costs.

5. Enhanced Control of System Automation and Instrumentation: CCRO systems, like system 100, are closely monitored and automated. The combination of a blocking permeate discharge valve 129 and orifice plate 149 simplifies the control logic during the discharge phase. With more predictable pressure and flow profiles, instrumentation can provide more accurate feedback, and control systems can respond more effectively. This leads to improved fine-tuning of CCRO operations, which can enhance efficiency and product water quality.

In summary, while either a blocking valve 129 in the permeate line 110 or an orifice plate 149 in the first discharge line 135 can individually improve certain aspects of operation, combining both devices 129, 149 in a CCRO system can yield significant, system-specific benefits: smoother cycle transitions, better membrane protection, enhanced water quality, longer membrane life, and more robust automated control.

Figure 4A:
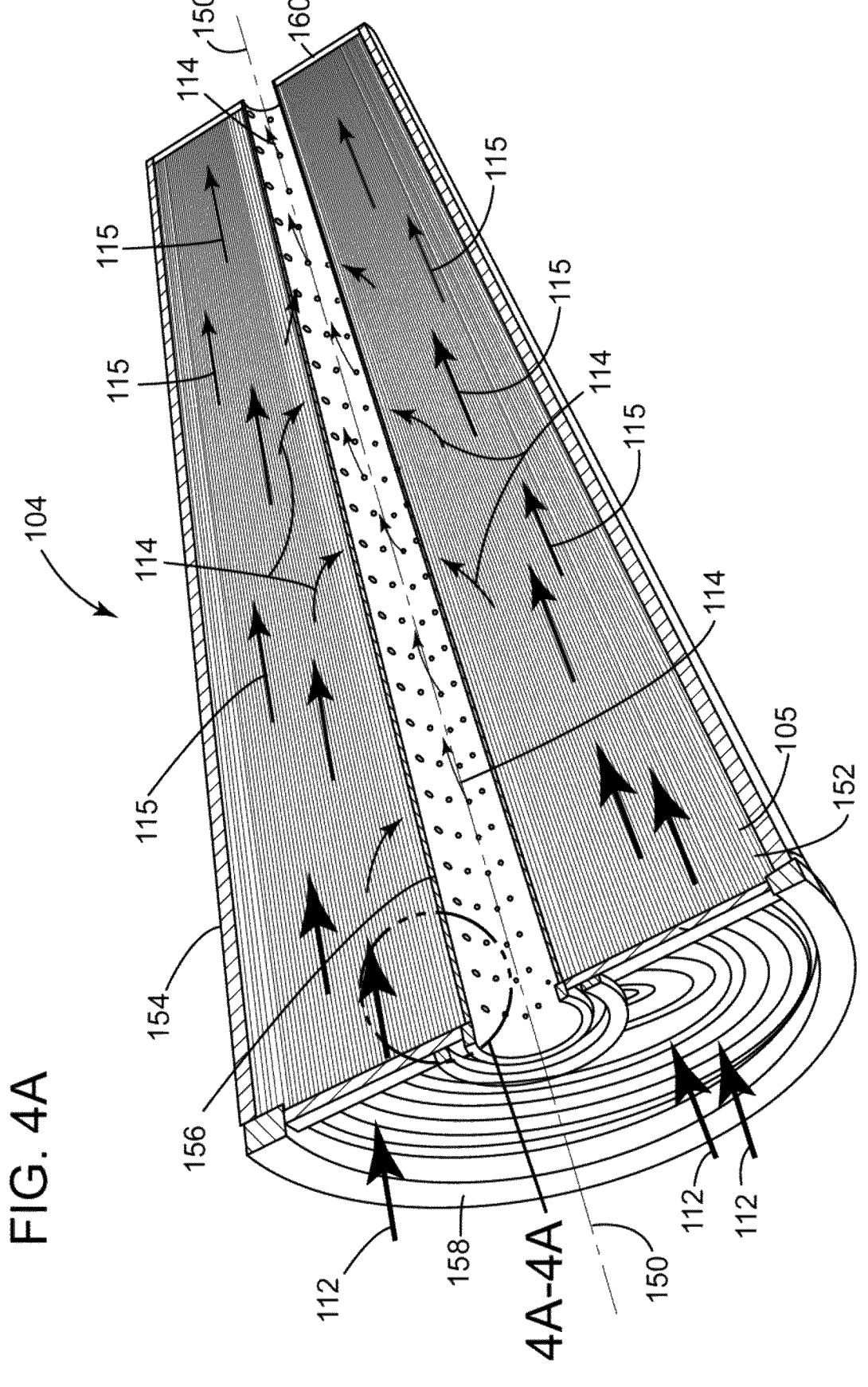
FIG. 4A depicts an example of a cross-sectional view of a membrane module, according to aspects described herein.

Referring to FIG. 4A, an example is depicted of a cross-sectional view of a membrane module 104, according to aspects described herein. The membrane module 104 is designed to fit into the pressure vessel 102 and to house the membrane 105. The system may include one or more pressure vessels with one or more membrane modules in each vessel. The membrane module 104 is configured to provide the mechanism that separates the concentrate 115 into a permeate (water) 114 stream and a concentrate 115 stream.

The membrane module 104 includes an outer sheath 154 and a permeate collection tube 156. The permeate collection tube 156 extends along the central axis 150 of the membrane module 150.

Figure 4B:
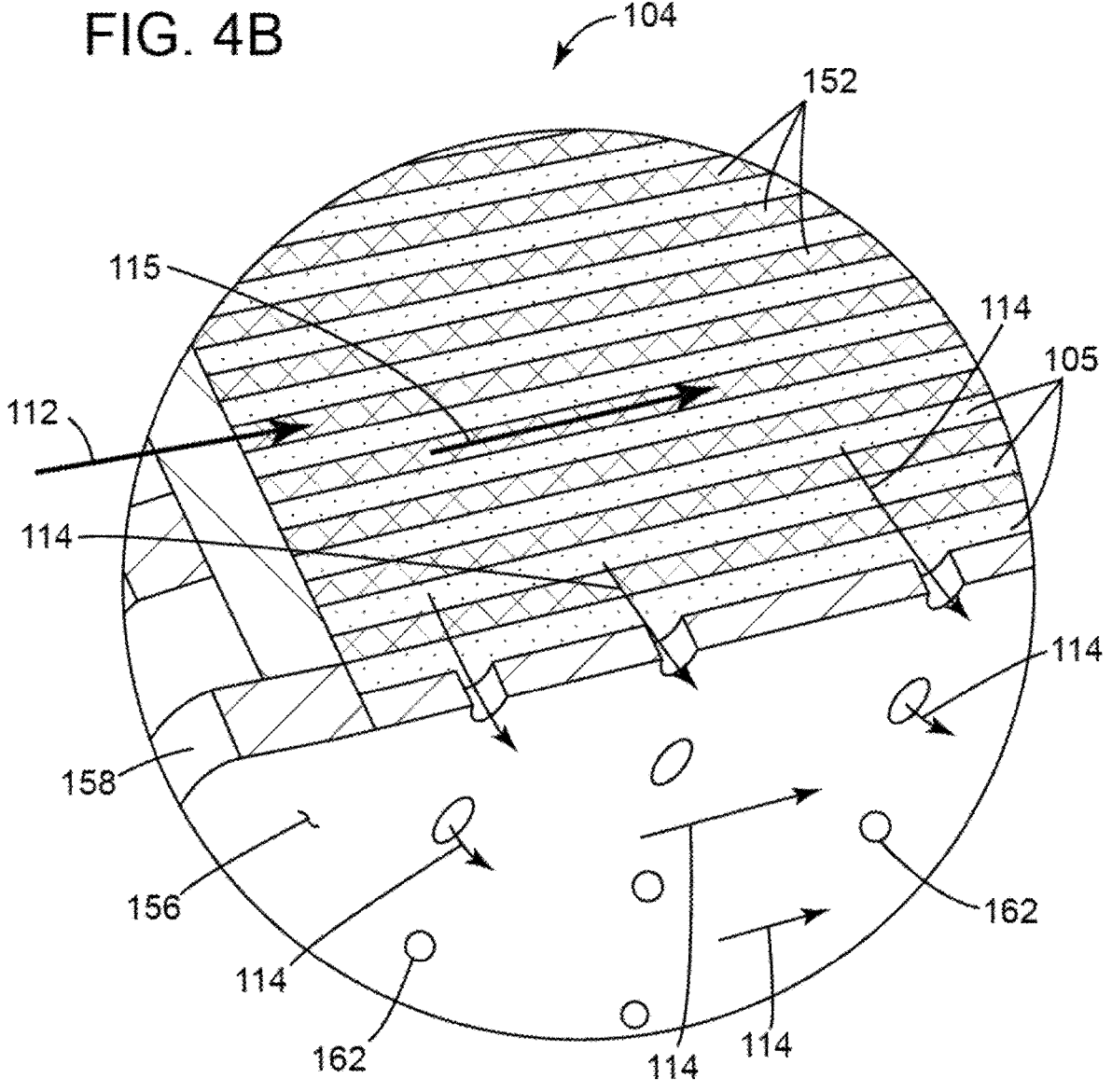
FIG. 4B depicts an example of an enlarged view of the membrane module within circle 4A-4A of FIG. 4A, according to aspects described herein.

The membrane 105 is disposed against a feed spacer mesh 152 (see FIG. 4B). The membrane 105 and mesh 152 are spirally wound around the collection tube 156, wherein the mesh 152 forms the spiral-shaped channel between the sheets of the spirally wound membrane 105.

Feedwater 112 is pressurized by the high pressure pump 116. As the feedwater 112 enters the membrane module 104 and is subjected to the process of reverse osmosis, the feedwater becomes concentrate 115. The concentrate 115 flows axially through the spacer mesh 152 within the spirally wound sheets of the membrane 105. Permeate 114 from the concentrate 115 flows radially through the membrane 105 via reverse osmosis and tangentially spirals through the mesh 152 towards the centrally located collection tube 156. As a result, the concentrate 115 becomes progressively more concentrated with dissolved solids as it flows axially from the upstream end 158 of the membrane module 104 to the downstream end 160 of the membrane module 104.

The permeate 114 in the collection tube 156 forms a permeate 114 stream that is directed out of the permeate outlet 110 of the pressure vessel 102. The concentrate 115 exiting the downstream end 160 of the membrane module 150 enters the upstream end 158 of the next membrane module in line (if there is one). Concentrate 115 from the last membrane module 104 in line forms a concentrate 115 stream that is directed out of the first or second ports 106, 108 of the pressure vessel 102.

Referring to FIG. 4B, an example is depicted of an enlarged view of the membrane module 104 within circle 4A-4A in FIG. 4A, according to aspects described herein. As discussed earlier herein, the membrane 105 and spacer mesh 152 are spirally wound around the collection tube 156, wherein the spacer mesh 152 forms the spiral-shaped channels between the spirally wound sheets of the membrane 105. In other words, the spacer mesh 152 and membrane 105 form alternating spiral-shaped channels and spiral-shaped sheets around the collection tube 156. The feedwater 112 and concentrate 115 flow axially along the spiral-shaped channel of the mesh 152. The permeate (water) 114 from the concentrate 115 flows radially through the membrane 105 via reverse osmosis and tangentially spirals through the spacer mesh 152 towards the centrally located collection tube 156. The permeate (water) 114 enters the collection tube 156 through collection tube orifices 162, where it combines with other permeate 114 to form a permeate stream 114 that flows axially along the collection tube 156.

Referring to FIGS. 5A, 5B, 5C and 5D, another example is depicted of a schematic of a reverse osmosis system 200 in a forward flow mode (FIG. 5A) a forward discharge mode (FIG. 5B), a reverse flow mode (FIG. 5C) and a reverse discharge mode (FIG. 5D), according to aspects described herein. The utility of reversing flow across the membrane modules to increase recovery has been commercially demonstrated by FRRO systems. Although the mechanics and arrangement used here are very different, the concept is combined herein with CCRO to further enhance recovery. The reverse osmosis system 200 is similar to the reverse osmosis system 100, wherein the same or similar features will be referenced with the same or similar reference numbers.

The reverse osmosis system 200 includes the pressure vessel 102. The pressure vessel 102 includes the first port 106, the second port 108 and the permeate outlet 110. One or more membrane modules 104 are disposed in the pressure vessel. Each membrane module 104 has one or more membranes 105 disposed therein. The one or more membranes 105 are configured to permeate water 114, via reverse osmosis, as the permeate 114 from the concentrate 115 flowing between the first and second ports 106, 108. The membranes 105 are also configured to block permeation of dissolved solids (not shown) from the concentrate 115. The pressure vessel 102 is configured to flow the water 114 as a permeate 114 out the permeate outlet 110.

The high pressure pump 116 is configured to pressurize the feedwater 112 and, therefore, the concentrate 115. The high pressure pump 116 includes the high pressure pump inlet 118 through which the feedwater 112 is supplied and the high pressure pump outlet 120 that is selectively connected to the first port 106 via first valve 202. The circulation pump 122 is configured to circulate the concentrate between the first and second ports 106, 108. The circulation pump 122 includes the circulation pump inlet 124 and the circulation pump outlet 126. Both the high pressure pump 116 and circulation pump 122 may include variable frequency drives to enable adjustment of their respective output pressure and flow.

A valved circulation apparatus 128 is configured to select between the forward flow mode (FIG. 5A) of the system 200 and the forward discharge mode (FIG. 5B) of the system 200 and a reverse flow mode (FIG. 5C) and optionally a reverse discharge mode (FIG. 5D) of the system 200. In the forward flow mode (FIG. 5A), the high pressure pump outlet 120 is connected to the first port 106, the circulation pump inlet 124 is connected to the second port 108 and the circulation pump outlet 126 is connected to the first port 106. In the forward discharge mode (FIG. 5B), the high pressure pump outlet 120 is connected to the first port 106, the circulation pump inlet 124 is connected to the high pressure pump inlet 118 and the circulation pump outlet 126 is connected to the first port 106, such that the circulation pump is configured to discharge the concentrate 115 from the system 200 through a first discharge line 225 connected to the second port 108. In the reverse flow mode (FIG. 5C), the high pressure pump outlet 120 is connected to the second port 108, the circulation pump inlet 124 is connected to the first port 106 and the circulation pump outlet 126 is connected to the second port 108.

In the reverse discharge mode (FIG. 5D), the circulation pump inlet 124 is connected to the high pressure pump inlet 118 and the circulation pump outlet 126 is connected to the second port 108, such that the circulation pump 122 is configured to discharge the concentrate 115 from the system 200 through a second discharge line 233 connected to the first port 106. Also, in the reverse discharge mode, the concentrate pressure may be maintained greater than the predetermined threshold osmotic pressure of the system 200, and a permeate discharge valve 236 connected to the permeate outlet 110 is closed to prevent permeate production.

In the forward flow mode (FIG. 5A), the concentrate 115 flows through the pressure vessel 102 in a forward flow direction from the first port 106 to the second port 108 and circulates back to the first port 106 via the circulation pump 122. In the forward flow mode, the system 200 produces permeate (i.e., water) 114 through the permeate outlet 110. In the forward discharge mode (FIG. 5B), the feedwater 112 flows into the pressure vessel 102 from the first port 106, displacing the concentrate 115 through the second port 108 and the concentrate 115 is discharged out of the system 200 through a first discharge line 225. In the reverse flow mode (FIG. 5C), the concentrate 115 flows through the pressure vessel 102 in a reverse flow direction from the second port 108 to the first port 106 and circulates back to the second port 108 via the circulation pump 122. In the reverse flow mode, the system 200 produces permeate (i.e., water) 114 through the permeate outlet 110. In the reverse discharge mode (FIG. 5D), the feedwater 112 flows into the pressure vessel 102 from the second port 108, displacing the concentrate 115 through the first port 106 and the concentrate 115 is discharged out of the system 200 through a second discharge line 233. In both discharge modes, the system 200 stops permeate production through the permeate outlet 110.

In both the forward flow mode (FIG. 5A) and the reverse flow mode (FIG. 5C) of system 200, the circulation pump 122 output flow rate may be preferably greater than the high pressure pump 116 output flow rate.

During the discharge mode (FIG. 5B and FIG. 5D), the high pressure pump 116 outlet pressure may be turned down and the circulation pump outlet pressure may be turned up such that the high pressure pump 116 outlet pressure is equal to the output pressure of the circulation pump 122 and both can contribute to the discharge flow. Additionally, the system 200 stops permeate production through the permeate outlet 110, either because the system pressure is below the system's predetermined threshold osmotic pressure or by closing a permeate outlet valve 238.

The valved circulation apparatus 128 of the system 200 in FIGS. 5A, 5B, 5C and 5D may include the following structure. The first valve 202 is connected via first tee 206 to the first port 106 and also connected to the high pressure pump outlet 120 via a second tee 208 in series connection with a third tee 210. A second valve 212 is connected via the first tee 206 to the first port 106 and also connected to the circulation pump inlet 124 via a fourth tee 214 in series connection with a fifth tee 216. A third valve 218 is connected to the fourth tee 214 and also connected to the second port 108 via a sixth tee 220 in series connection with a seventh tee 222. A fourth valve 224 is positioned in the first discharge line 225 and is connected to the second port 108 via the seventh tee 222. A fifth valve 226 is connected to the second tee 208 and sixth tee 220. The circulation pump outlet 126 is connected to the third tee 210. A sixth valve 228, which may be unidirectional, is connected to the circulation pump inlet 124 via the fifth tee 216 and also connected to the high pressure pump inlet 118 via an eighth tee 230. A feed line 232 for supplying the feedwater 112 is connected to the eighth tee 230.

If the reverse discharge mode is included, a ninth tee 234 is positioned in series connection between the first valve 202 and the first tee 206. Additionally, a seventh valve 236 is disposed in the second discharge line 233 and is connected to the first port 106 through the ninth tee 234 in series connection with the first tee 206.

Figure 5A:
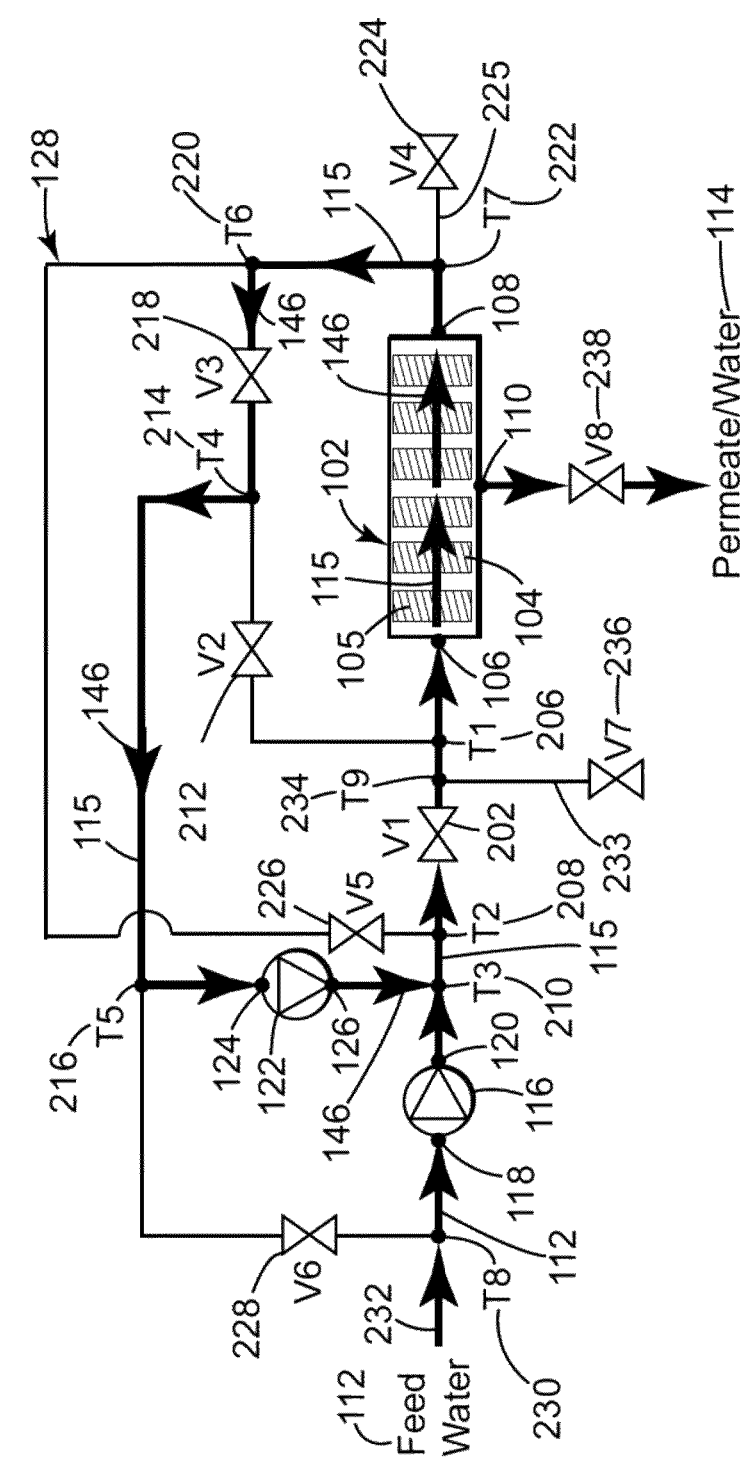
FIG. 5A depicts another example of a schematic of a reverse osmosis system in a forward flow mode, according to aspects described herein.

Referring more specifically to FIG. 5A, during the forward flow mode, the first valve 202, third valve 218 and permeate discharge valve 238 are open and the second valve 212, fourth valve 224, fifth valve 226, sixth valve 228 and seventh valve 236 are closed. Configuring the valves in this way, enables the high pressure pump 116 to pressurize the system 200 and to replenish concentrate 115 lost during permeate 114 production (i.e., to replenish the water 114 lost through the permeate outlet 110). Additionally, this valve configuration enables the circulation pump 122 to circulate the concentrate 115 through the pressure vessel 102 in a forward flow direction from the first port 106 to the second port 108. Additionally, this valve configuration enables permeate production out of the permeate port 110 and through the permeate discharge valve 238. In other words, as indicated by flow arrows 146, the concentrate 115 circulates from the first port 106, to the second port 108, to the seventh tee 222, to the sixth tee 220, to the third valve 218, to the forth tee 214, to the fifth tee 216, through the circulation pump 122, to the third tee 210 to the second tee 208 to the first valve 202, to the ninth tee 234 (if the reverse discharge mode is included), to the first tec 206 and back to the first port 106.

When the concentration of salts in the concentrate 115 exceeds the saturation level, these salts start to precipitate which clogs the membranes 105. The time required to precipitate salts after their concentration has reached the saturation level is known as the induction time, which depends primarily on the degree to which the saturation level is exceeded. Accordingly, to prevent the precipitation of salts from the concentrate 115, the system 200 may switch to a forward or reverse discharge mode after a predetermined saturation level of the system 200 has been reached, and before an additional predetermined induction time of the system 200 has elapsed.

Figure 5B:
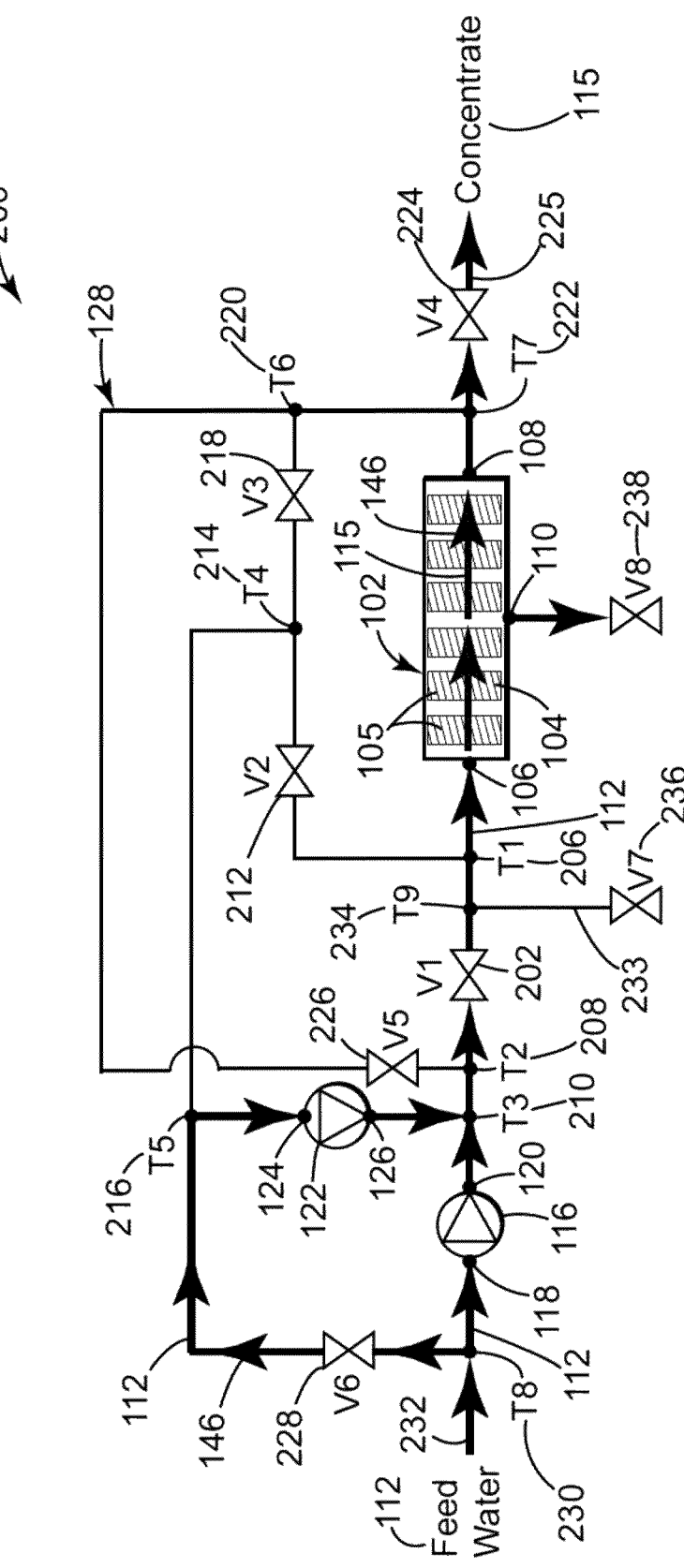
FIG. 5B depicts an example of a schematic of the reverse osmosis system of FIG. 5A in a forward discharge mode, according to aspects described herein.

Referring more specifically to FIG. 5B, during the forward discharge mode, the first 202, fourth 224 and sixth 228 valves are open; and the second 212, third 218, fifth 226 seventh 236 (if the reverse discharge mode is included) and permeate discharge valve 238 are closed, to enable discharge of the concentrate 115 through the fourth valve 224. In other words, as indicated by flow arrows 146, the feedwater 112 flows from the feed line 232, to the eighth tee 230, to the sixth valve 228, to the fifth tee 216, through the circulation pump 122, to the third tec 210, to the second tee 208, to the first valve 202, to the ninth tee 234 (if the reverse discharge mode is included) and to the first tee 206, wherein the feedwater 112 enters the first port 106 of the pressure vessel 102. Accordingly, the feedwater 112 displaces the concentrate 115 in the pressure vessel 102, which flows through the pressure vessel 102, to the seventh tee 222, through the fourth valve 224 and out of the first discharge line 225 of the system 200. Additionally, permeate production is prevented via the closed permeate discharge valve 238.

Figure 5C:
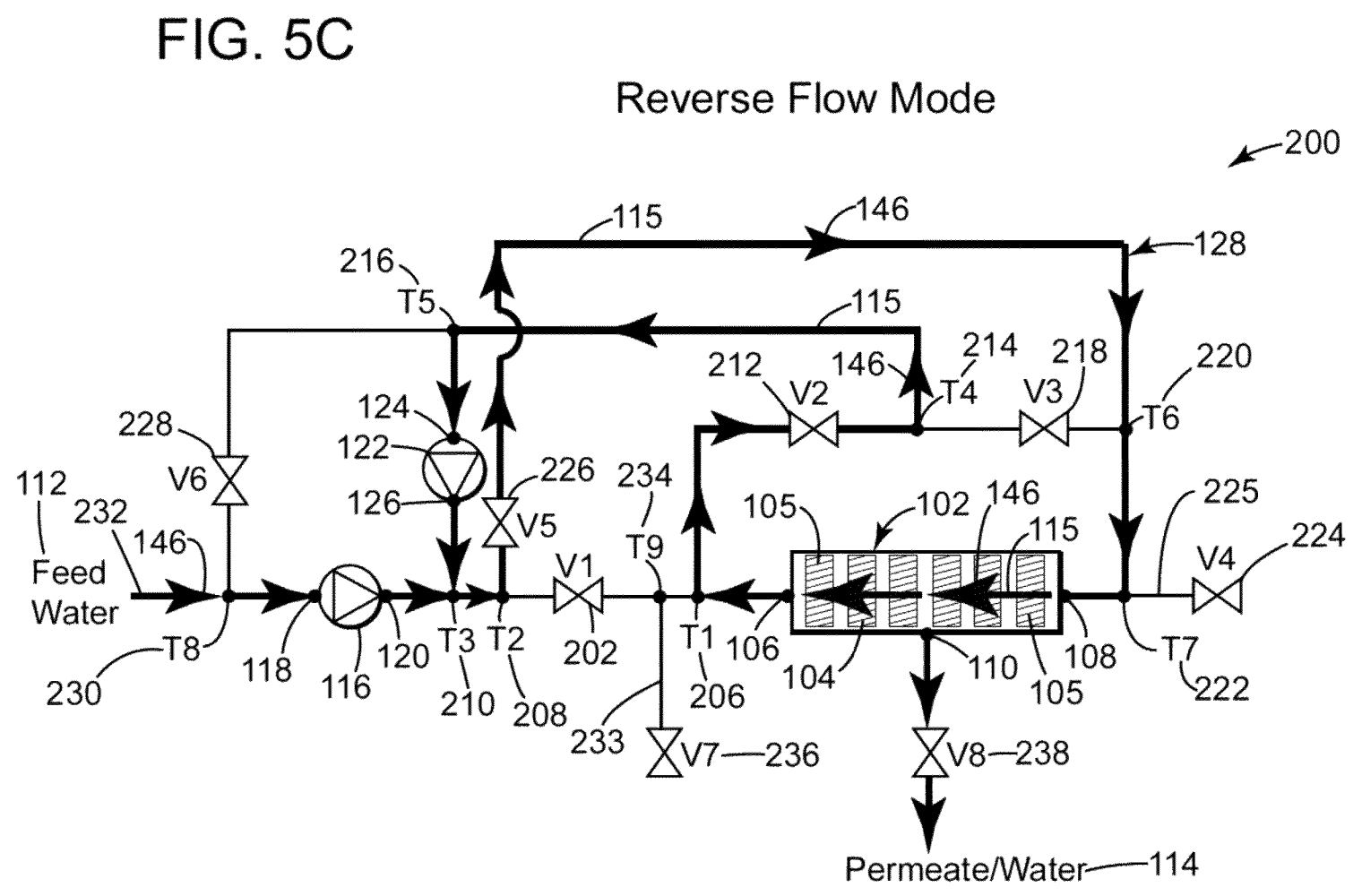

Referring more specifically to FIG. 5C, during the reverse flow mode, the second valve 212, fifth valve 226 and permeate discharge valve 238 are open and the first 202, third 218, fourth 224, sixth 228 and seventh 236 (if the reverse discharge mode is included) valves are closed. Configuring the valves in this way, enables the high pressure pump 116 to pressurize the system 200 and to replenish concentrate 115 lost during permeate 114 production (i.e., to replenish the water 114 lost through the permeate outlet 110). To accomplish this, feedwater 112 enters the system 200 through the feed line 232, the eighth tee 230, the high pressure pump 116 and the third tee 210, where it is mixed with recirculated concentrate 115. The mixture proceeds to the second tee 208, through the fifth valve 226 and the sixth tee 220, to the seventh tee 222, to the second port 108 and through the pressure vessel 102 in a reverse flow direction to first port 106. Additionally, this valve configuration enables the circulation pump 122 to recirculate the concentrate 115 from the first port 106 to the second port 108. In other words, as indicated by flow arrows 146, the concentrate 115 circulates from the first port 106, to the first tee 206, through the second valve 212, to the fourth tee 214, to the fifth tee 216, through the circulation pump to the third tee 210, where it mixes with the feedwater 112.

Figure 5D:
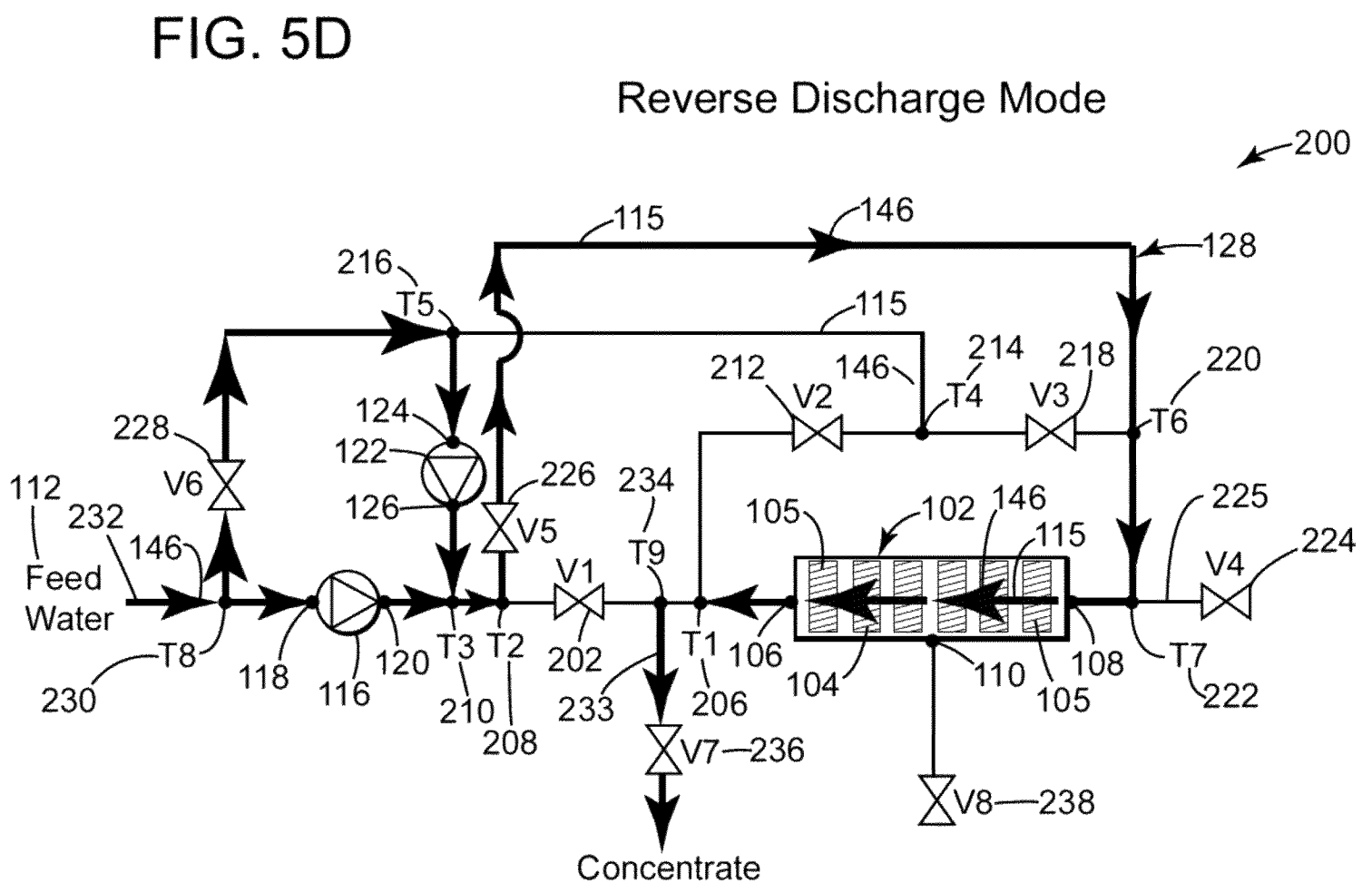

Referring more specifically to FIG. 5D, during the reverse discharge mode, the fifth 226, sixth 228 and seventh 234 valves are open; and the first 202. second 212, third 218 and forth 224 and permeate discharge valve 238 are closed, to enable discharge of the concentrate 115 through the seventh valve 234 in the second discharge line 233 and to prevent permeate production through the permeate discharge valve 236. In other words, as indicated by flow arrows 146, the feedwater 112 flows from the feed line 232, to the eighth tee 230, to the sixth valve 228, to the fifth tee 216, through the circulation pump 122, to the third tee 210, to the second tee 208, to the fifth valve 226, to the sixth tee 220 and to the seventh tee 222, wherein the feedwater 112 enters the second port 108 of the pressure vessel 102. Accordingly, the feedwater 112 displaces the concentrate 115 in the pressure vessel 102, which flows through the pressure vessel 102, to the ninth tee 234, through the seventh valve 234 and out of the second discharge line 233 of the system 200.

It should be noted that the valves and tees as used herein, may include standalone functioning valves and tees or may be internal components to more complicated flow control devices. For example, in the system 200, the first valve 202, fifth valve 226 and second tee 208 may comprise a single three-way valve.

Advantageously in system 200, the use of the reverse flow mode has the added advantage of a scrubbing effect, introduced by the back-and-forth flow. The feed spacer mesh 152, which is oriented diagonally to reduce dead zones, has regions of high and low flow caused by the unidirectional flow in the forward flow mode (FIG. 5A). When the flow is reversed (FIG. 5C), the regions of high and low flow are inverted, so that crystallization of salts and growth of microbes are impeded. Also, the concentrate side of the membranes 105 is mildly scrubbed by the bidirectional flow.

Also advantageously, the last membrane module which has been subjected to the highest salinity during forward flow becomes the first when the flow is reversed and is now exposed to the lowest salinity of the feedwater, increasing the cleaning effect and the inhibition of microbial growth.

Figure 5E:
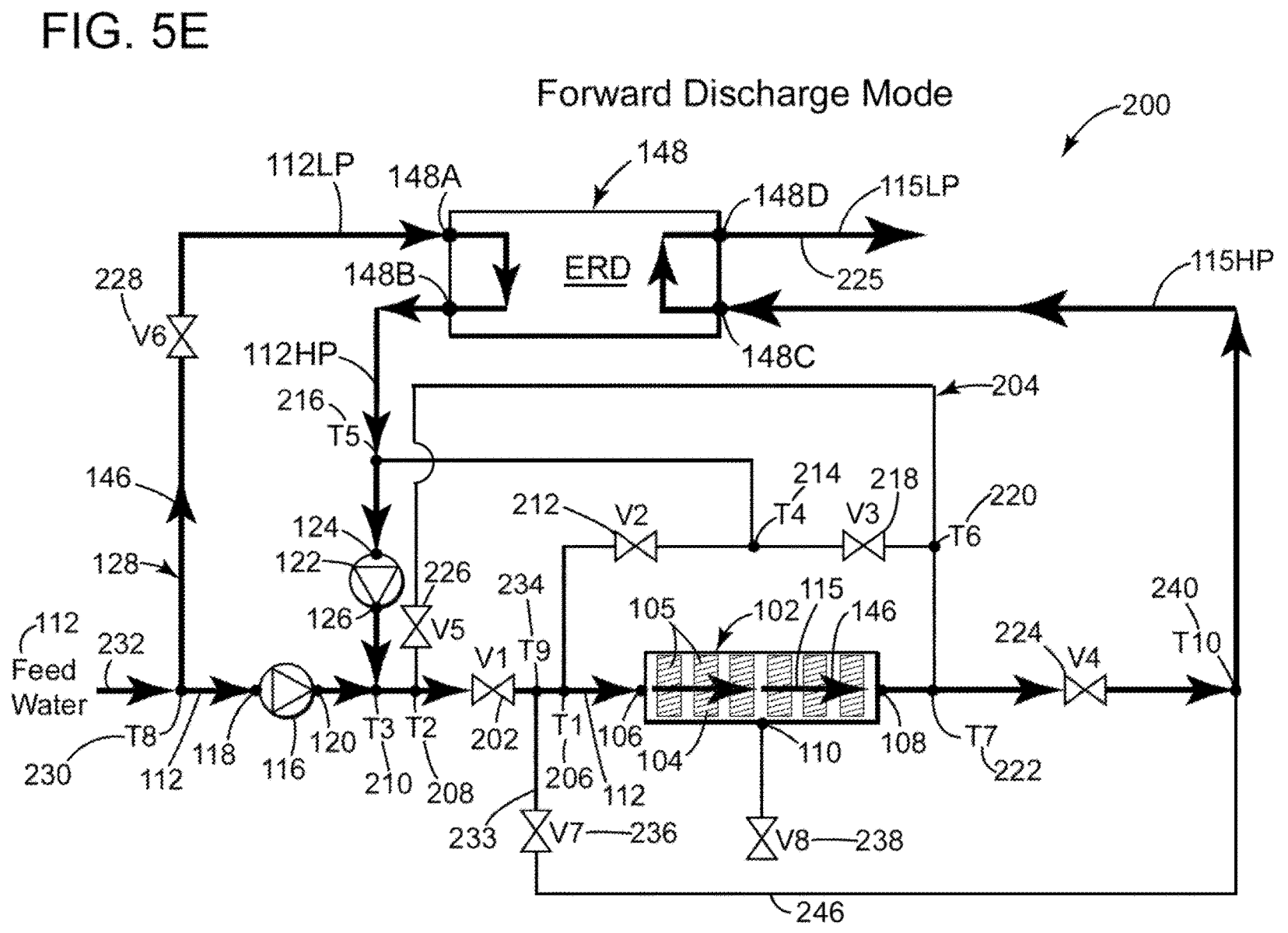
Figure 5F:
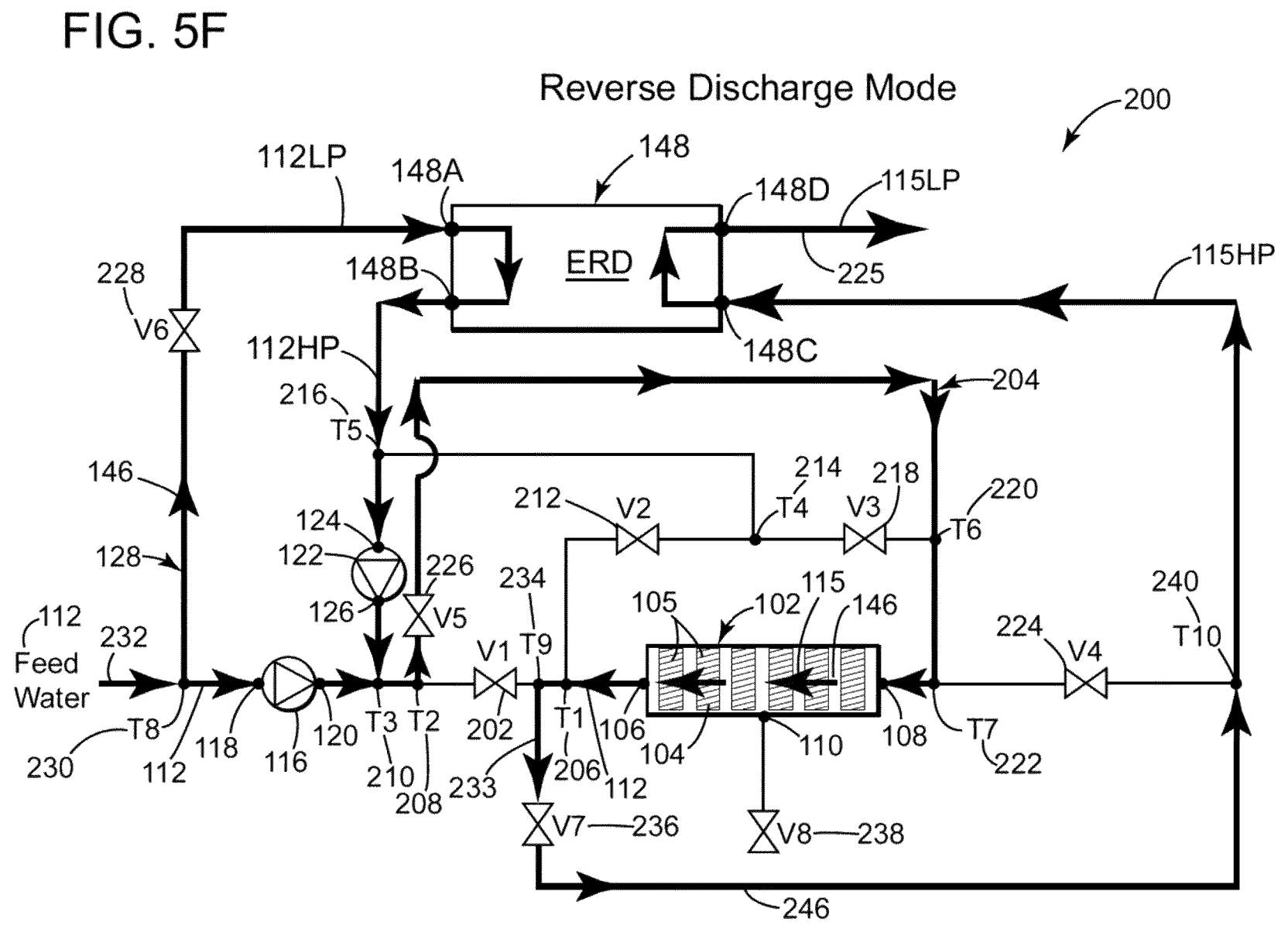

Referring to FIGS. 5E and 5F, an example is depicted of a schematic of the reverse osmosis system 200 of FIG. 5A with an energy recovery device (ERD) 148 included, during the forward discharge mode (FIG. 5E) or the reverse discharge mode (FIG. 5F), according to aspects described herein. During the forward or reverse discharge modes of system 200 (FIG. 5E or 5F), the valved circulation apparatus 128 is configured such that feedwater 112 from the feedline 232 enters feedwater input port 148A of the ERD 148 as low pressure feedwater 112LP, and concentrate 115 from the pressure vessel 102 enters concentrate input port 148C of the ERD 148 as high pressure concentrate 115HP. Energy from the hydraulic pressure of the high pressure concentrate 115HP is transferred from the high pressure concentrate 115HP to the low pressure feedwater 112LP within the ERD 148. Thereafter, the feedwater 112 exits feedwater output port 148B of the ERD 148 as high pressure feedwater 112HP and flows into the circulation pump inlet 124. Simultaneously, the concentrate 115 exits the concentrate output port 148D of the ERD 148 as low pressure concentrate 115LP, wherein it is discharged from the system 200 out of the discharge line 225.

Advantageously, by transferring the high pressure energy of the high pressure concentrate 115HP, that would otherwise be wasted, to the low pressure feedwater 112LP, the pressure fluctuations that the pressure vessel 102 and membrane modules 104 are exposed to when switching from the forward flow mode FIG. 5A to the forward or reverse discharge mode FIG. 5E or 5F are significantly reduced. As such, the material fatigue on the pressure vessel 102 and membrane modules 104 are also advantageously significantly reduced. Moreover, the same advantages occur when switching from the reverse flow mode FIG. 5C to the forward or reverse discharge mode FIG. 5E or 5F.

In the examples of the discharge mode of system 200 of FIG. 5E or 5F, although the ERD may cause the concentrate pressure to be above the osmotic pressure, permeate 114 is not produced out of the permeate outlet 110 of the pressure vessel 102 because permeate discharge valve 238 in the permeate discharge line is closed.

Referring more specifically to FIG. 5E, during the forward discharge mode with an ERD 148 in the system 200, the second 212, third 218, fifth 226, seventh 236 and eighth 238 valves are closed. Additionally, the first 202, fourth 224 and sixth 228 valves are open. Accordingly, as indicated by directional arrows 146, the feedwater 112 flows from the feedline 232 to the eighth tee 230, through the sixth valve 228, to the feedwater input port 148A of the ERD 148, through the feedwater output port 148B, to the fifth tee 216, through the circulation pump 122, to the third tee 210, to the second tec 208, through the first valve 202 to the ninth tee 234 (if the reverse discharge mode is included) to the first tee 206 and to the first port 106. The feedwater then becomes a concentrate 115 as it flows in a forward flow direction from the first port 106 to the second port 108 of pressure vessel 102. The concentrate 115 then flows to the seventh tee 222, through the fourth valve 224 to the tenth tee 240 to the concentrate input port 148C of the ERD 148 and out the concentrate output port 148D, wherein it is discharged from the system 200 through the first discharge line 225.

Referring more specifically to FIG. 5F, during the reverse discharge mode with an ERD 148 in the system 200, the first 202, second 212, third 218, fourth 224, and eighth 238 valves are closed. Additionally, the fifth 226, sixth 228 and seventh 236 valves are open. Accordingly, as indicated by directional arrows 146, the feedwater 112 flows from the feedline 232 to the eighth tee 230, through the sixth valve 228, to the feedwater input port 148A of the ERD 148, through the feedwater output port 148B, to the fifth tee 216, through the circulation pump 122, to the third tee 210, to the second tee 208, through the fifth valve 226 to the sixth tee 220, to the seventh tee 222 and to the second port 108. The feedwater then becomes a concentrate 115 as it flows in a reverse flow direction from the second port 108 to the first port 106 of pressure vessel 102. The concentrate 115 then flows to the first tee 205, to the ninth tee 234, through the second discharge line 233, through the seventh valve 236 and through bypass line 246 to the tenth tee 240. From the tenth tee 240 the concentrate 115 flows to the concentrate input port 148C of the ERD 148 and out the concentrate output port 148D, wherein it is discharged from the system 200 through the first discharge line 225.

Figure 5G:
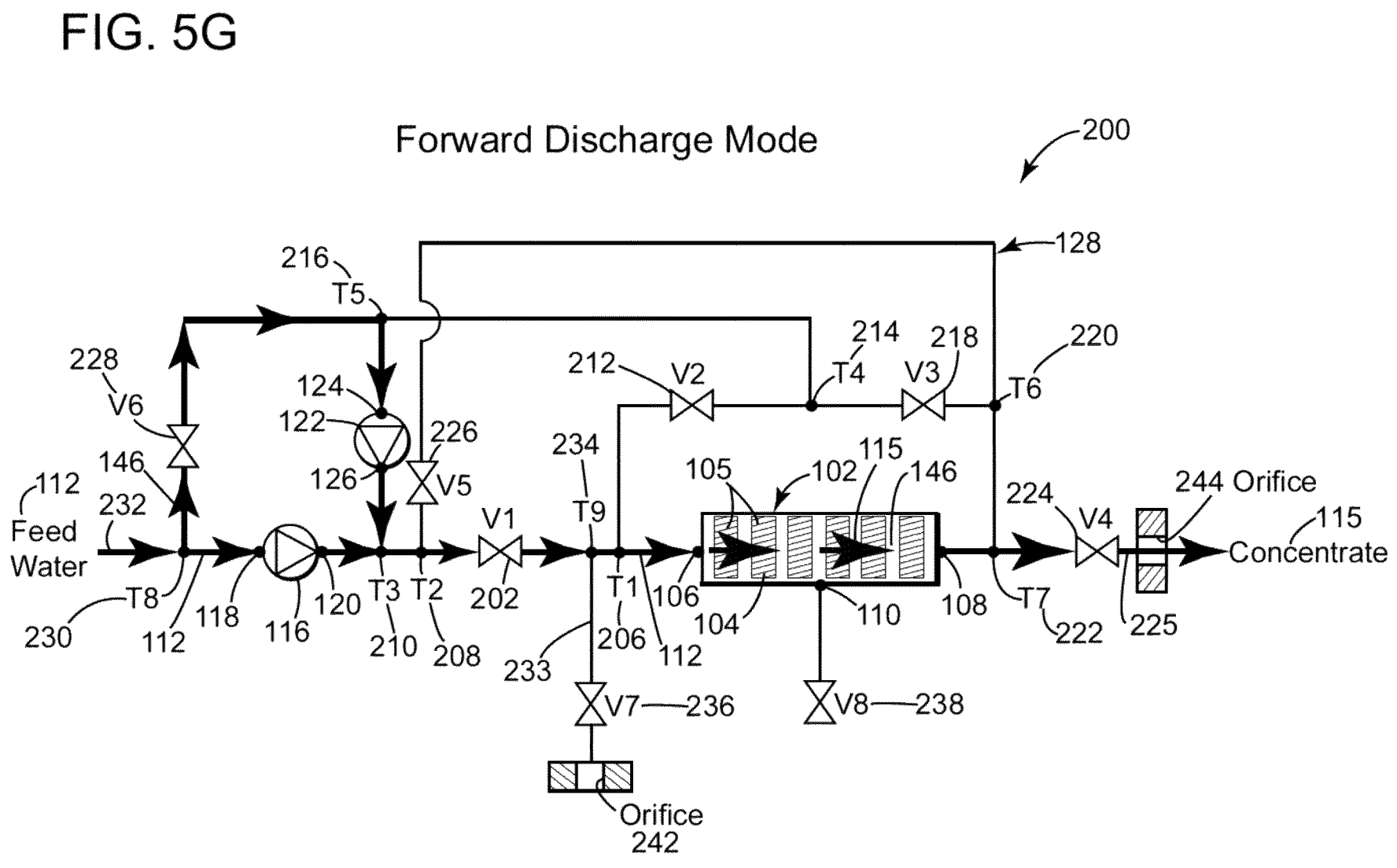
Figure 5H:
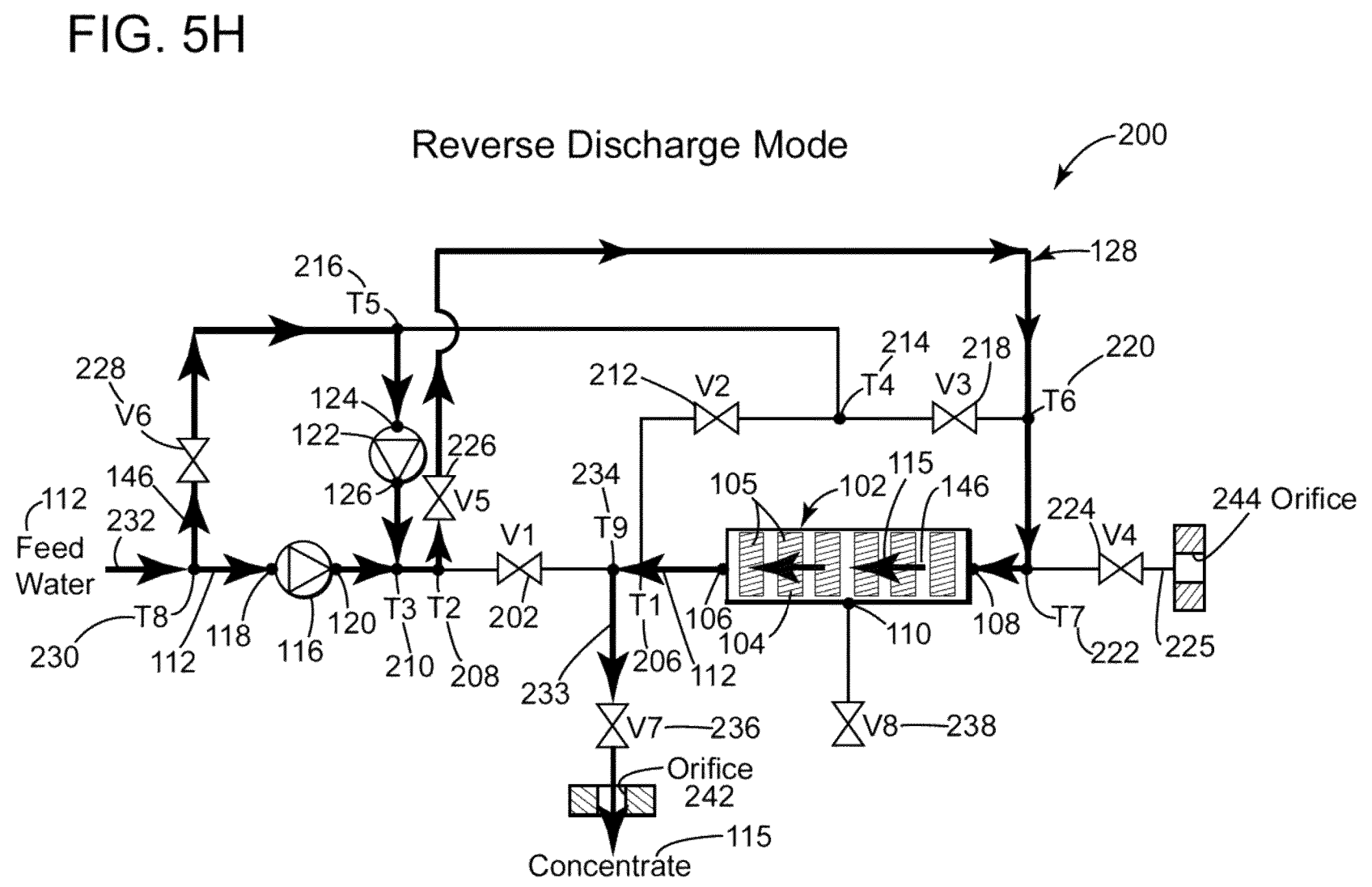

Referring to FIGS. 5G and 5H, another embodiment of the system 200 is shown in its forward discharge mode (FIG. 5G) and reverse discharge mode (FIG. 5H), wherein the ERD 148 is replaced with a first orifice 244 and a second orifice 242 in the first and second discharge lines 225, 233 respectively of the system 200.

Referring more specifically to FIG. 5G, during the forward discharge mode, the first 202, fourth 224, sixth 228 valves are open. Additionally, the second 212, third 218, fifth 226, seventh 236 and eighth 238 valves are closed. Accordingly, as indicated by directional arrows 146, the feedwater 112 flows from the feedline 232 to the eighth tee 230, through the sixth valve 228, to the fifth tee 216, through the circulation pump 122, to the third tee 210, to the second tee 208, through the first valve 202, to the ninth tee 234 (if the reverse discharge mode is included), to the first tee 206 and to the first port 106. The feedwater 112 then becomes a concentrate 115 as it flows in a forward flow direction from the first port 106 to the second port 108 of pressure vessel 102. The concentrate 115 then flows to the seventh tee 222, through the fourth valve 224 and through the first orifice 224, wherein the concentrate 115 is discharged from the system 200 through the first discharge line 225.

Advantageously, the first orifice 224 is sized to provide a first predetermined pressure drop in the first discharge line 225 that reduces pressure fluctuations caused by switching from the forward or reverse flow modes to the forward discharge mode.

Also advantageously, no permeate is produced during the forward discharge mode because the permeate discharge valve 238 is closed. Wherein, for reasons explained earlier herein, blocking permeate production during the forward discharge mode is beneficial for the permeate quality.

Referring more specifically to FIG. 5H, during the reverse discharge mode, the fifth 226, sixth 228, and seventh 236 valves are open. Additionally, the first 202, second 212, third 218, fourth 224 and eighth 238 valves are closed. Accordingly, as indicated by directional arrows 146, the feedwater 112 flows from the feedline 232 to the eighth tee 230, through the sixth valve 228, to the fifth tee 216, through the circulation pump 122, to the third tee 210, to the second tee 208, through the fifth valve 226, to the sixth tee 220, to the seventh tee 222 and to the second port 108. The feedwater 112 then becomes a concentrate 115 as it flows in a reverse flow direction from the second port 108 to the first port 106 of pressure vessel 102. The concentrate 115 then flows to the ninth tee 234, through the seventh valve 236 and through the second orifice 236, wherein the concentrate 115 is discharged from the system 200 through the second discharge line 233.

Advantageously, the second orifice 242 is sized to provide a second predetermined pressure drop in the second discharge line 233 that reduces pressure fluctuations caused by switching from the forward or reverse flow modes to the reverse discharge mode.

Also advantageously, no permeate is produced during the reverse discharge mode because the permeate discharge valve 238 is closed. Wherein, for reasons explained earlier herein, blocking permeate production during the reverse discharge mode is beneficial for the permeate quality.

In an alternative embodiment, the first discharge line 225 and the second discharge line 233 may be connected together (not shown) and discharge through just the first orifice 244. The first orifice 244 may be sized to provide a predetermined pressure drop in the first and second discharge lines 225, 233 that reduces pressure fluctuations caused by switching from the forward or reverse flow modes to the reverse discharge mode. Advantageously, this alternative embodiment would have only a single first orifice 244, rather than a first and second orifice 244, 242 and, therefore, may be less expensive to build.

Moreover, for all the same reasons discussed earlier with regard to FIG. 3D, the combination of a closed permeate discharge valve 236 and a first and second orifice 244, 242 provides important advantages. More specifically, while either a permeate discharge valve 236 in the permeate outlet line 110 or an orifice plate 244, 242 in the first and second discharge lines 225, 233 can individually improve certain aspects of operation, combining both the permeate discharge valve 236 with the first 244 and second 242 orifice plates in CCRO system 200 can yield significant, system-specific benefits: smoother cycle transitions, better membrane protection, enhanced water quality, longer membrane life, and more robust automated control.

The valved circulation apparatus 128 of FIGS. 5A-5H may advantageously be configured to cycle in sequential order from the forward flow mode, then to the reverse discharge mode, then to the reverse flow mode, then to the forward discharge mode and then back to the forward flow mode to repeat the cycle. This has the added benefit of immediately introducing fresh feedwater to the membrane module that was exposed to the highest salinity during the forward and reverse flow modes, thereby arresting incipient scaling every time the flow direction is switched between a forward flow direction (from the first port 106 to the second port 108 of the pressure vessel 102) and a reverse flow direction (from the second port 108 to the first port 106 of the pressure vessel 102).

Referring to FIG. 6A, an example is depicted of a flow diagram of a method 300 of reverse osmosis, according to aspects described herein. The method 300 begins at 302 by selecting a forward flow mode (FIG. 3A or 5A) of a reverse osmosis system 100, 200 via a valved circulation apparatus 128 of the system, wherein a circulation pump outlet 126 of a circulation pump 122 of the system 100, 200 is connected to a first port 106 of a pressure vessel 102 of the system 100, 200 and a circulation pump inlet 124 of the circulation pump 122 is connected to a second port 108 of the pressure vessel 102.

At 304, concentrate 115 is pressurized, via a high pressure pump 116 of the system 100, 200 to flow through the pressure vessel 102 in a forward flow direction from the first port 106 to the second port 108. In the forward flow mode, the high pressure pump 116 output pressure may be equal to the circulation pump 122 output pressure, and the circulation pump 122 output flow rate may be greater than the high pressure pump 116 output flow rate.

At 306, water 114 is permeated from the concentrate 115 via reverse osmosis through one or more membranes 105 of membrane modules 104 disposed in the pressure vessel 102, as the concentrate 115 flows in the forward flow direction.

At 308, the water 114 is directed to flow as a permeate 114 out of a permeate outlet 110 of the pressure vessel 102 as the concentrate flows in the forward flow direction.

At 310, permeation of dissolved solids from the concentrate 115 is blocked from getting through the one or more membranes 105, as the concentrate 115 flows in the forward flow direction.

At 312, the concentrate 115 is circulated, via the circulation pump 122, back from the second port 108 to the first port 106.

At 314, a forward discharge mode (FIGS. 3B, 3C, 3D, 5B, 5E, 5G) of the system 100, 200 is selected, via the valved circulation apparatus 128, wherein the circulation pump inlet 124 is connected to a high pressure pump inlet 118 of the high pressure pump 116 and the circulation pump outlet 126 is connected to the first port 106. To prevent the precipitation of salts from the concentrate 115, the system 100, 200 may switch to the forward discharge mode after a predetermined saturation level of the system 100, 200 has been reached, and before an additional predetermined induction time of the system 100, 200 has elapsed.

At 316, in the forward discharge mode, the concentrate 115 flowing from the second port 108 is discharged out of a first discharge line 135, 225 of the system 100, 200 impelled by the circulation pump 122 injecting fresh feedwater 112.

At 318, the concentrate 115 is pressurized, via the high pressure pump 116, to a pressure that may be greater than a predetermined threshold osmotic pressure of the system 100, 200.

At 319, the production of permeate 114 is prevented by closing a permeate discharge valve 129, 238 connected to the permeate outlet 110 of the pressure vessel 102.

Referring to FIG. 6B, an example is depicted of a flow diagram of a continuation of the method 300 of reverse osmosis of FIG. 6A, according to aspects described herein. The method 300 continues at 320 by selecting a reverse flow mode (FIG. 5C) of the system 200, via the valved circulation apparatus 128, wherein the high-pressure pump outlet 120 is connected to the second port 108, the circulation pump inlet 124 is connected to the first port 106 and the circulation pump outlet 126 is connected to the second port 108.

At 322, concentrate 115 is pressurized, via a high pressure pump 116 to flow through the pressure vessel 102 in a reverse flow direction from the second port 108 to the first port 106. In the reverse flow mode, the high pressure pump 116 output pressure may be equal to the circulation pump 122 output pressure, and the circulation pump 122 output flow rate may be preferably greater than the high pressure pump 116 output flow rate.

At 324, water 114 is permeated from the concentrate 115 via reverse osmosis through one or more constituent membranes 105 of the membrane modules 104 disposed in the pressure vessel 102, as the concentrate 115 flows in the reverse flow direction.

At 326, in the reverse flow mode, the water 114 is directed to flow as a permeate 114 out of the permeate outlet 110 of the pressure vessel 102.

At 328, permeation of dissolved solids from the concentrate 115 is blocked from getting through the one or more membranes 105, as the concentrate flows in the reverse flow direction.

At 330, the concentrate 115 is circulated, via the circulation pump 122, back from the first port 106 to the second port 108 in the reverse flow direction.

Referring to FIG. 6C, an example is depicted of a flow diagram of a continuation of the method 300 of reverse osmosis of FIGS. 6A and 6B, according to aspects described herein. The method 300 continues at 332 by selecting a reverse discharge mode (FIGS. 5D, 5F, 5H) of the system 200, via the valved circulation apparatus 128, wherein the circulation pump inlet 124 is connected to the high pressure pump inlet 118 and the circulation pump outlet 126 is connected to the second port 108.

At 334, the concentrate is discharged from the system 200 through a second discharge line 233 connected to the first port 106 when the system 200 is in the reverse discharge mode.

At 336, the concentrate 115 is pressurized, via the high pressure pump 116, to a pressure that may be greater than a predetermined threshold osmotic pressure of the system 200.

At 338, production of permeate 114 is prevented by closing a permeate discharge valve 238 connected to the permeate outlet 110.

At 340, the modes are optionally switched in sequential order of:

from the forward flow mode to the reverse discharge mode, from the reverse discharge mode to the reverse flow mode, from the reverse flow mode to the forward discharge mode, and from the forward discharge mode to the forward flow mode.

Referring to FIG. 6D, an example is depicted of a flow diagram of a continuation of the method 300 of reverse osmosis of FIGS. 6A, 6B and 6C, according to aspects described herein. The method 300 continues at 342 by flowing feedwater 112, from a feedline 144, 232 connected to the high pressure pump inlet 118, as a low pressure feedwater into an energy recovery device (ERD) 148.

At 344, the concentrate 115, from the pressure vessel 102 is directed to flow as a high pressure concentrate into the ERD 148.

At 346 energy from hydraulic pressure of the high pressure concentrate 115 is transferred to the low pressure feedwater 112, within the ERD 148.

At 348, the feedwater 112 is directed to flow as a high pressure feedwater 112 out of the ERD 148 and into the circulation pump inlet 124.

At 350, the concentrate 115 is directed to flow as a low pressure concentrate 115 out of the ERD 148.

At 352, the low pressure concentrate 115 is discharged out of the discharge line 135, 225 of the system 100, 200.

Referring to FIG. 6E, an example is depicted of a flow diagram of another continuation of the method 300 of reverse osmosis of FIGS. 6A, 6B and 6C, according to aspects described herein. The method steps 354 to 356 of FIG. 6E is an alternative to the method steps 342 to 352 of 6D. The method 300 continues from step 340 of FIG. 6C by positioning a first orifice 244 in the first discharge line 225. The first orifice 244 is sized to provide a predetermined pressure drop in the first discharge line 225 that reduces pressure fluctuations caused by switching from the forward flow mode or the reverse flow mode to the forward discharge mode.

At 356, a second orifice 242 is positioned in the second discharge line 233. The second orifice 242 is sized to provide a second predetermined pressure drop in the second discharge line 233 that reduces pressure fluctuations caused by switching from the forward or reverse flow mode to the reverse discharge mode.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it has the full scope defined by the language of the following claims.

What is claimed is:

1. A method of reverse osmosis comprising:

selecting a forward flow mode of a reverse osmosis system, via a valved circulation apparatus of the system, wherein a circulation pump outlet of a circulation pump of the system is connected to a first port of a pressure vessel of the system and a circulation pump inlet of the circulation pump is connected to a second port of the pressure vessel;

pressurizing concentrate, via a high pressure pump of the system, to flow through the pressure vessel in a forward flow direction from the first port to the second port;

permeating water from the concentrate via reverse osmosis through one or more membranes of one or more membrane modules disposed in the pressure vessel, as the concentrate flows in the forward flow direction;

flowing the water as a permeate out of a permeate outlet of the pressure vessel;

blocking permeation of dissolved solids from the concentrate through the membranes, as the concentrate flows in the forward flow direction;

circulating, via the circulation pump, the concentrate back from the second port to the first port in the forward flow direction;

selecting a forward discharge mode of the system, via the valved circulation apparatus, wherein the circulation pump inlet is connected to a high pressure pump inlet of the high pressure pump and the circulation pump outlet is connected to the first port;

discharging the concentrate from the system through a first discharge line connected to the second port when the system is in the forward discharge mode;

pressurizing the concentrate, via the high pressure pump, to a pressure that is greater than a predetermined threshold osmotic pressure of the system; and preventing production of permeate by closing a permeate discharge valve connected to the permeate outlet.

2. The method of claim 1, comprising:

selecting a reverse flow mode, via the valved circulation apparatus, wherein the circulation pump inlet is connected to the first port and the circulation pump outlet is connected to the second port;

pressurizing the concentrate, via the high pressure pump, to flow through the pressure vessel in a reverse flow direction from the second port to the first port;

permeating water from the concentrate via reverse osmosis through the membranes disposed in the membrane modules, as the concentrate flows in the reverse flow direction;

flowing the water as a permeate out of the permeate outlet of the pressure vessel;

blocking permeation of dissolved solids from the concentrate through the membranes, as the concentrate flows in the reverse flow direction; and circulating, via the circulation pump, the concentrate back from the first port to the second port in the reverse flow direction.

3. The method of claim 2, comprising:

selecting a reverse discharge mode, via the valved circulation apparatus, wherein the circulation pump inlet is connected to the high pressure pump inlet and the circulation pump outlet is connected to the second port;

discharging the concentrate from the system through a second discharge line connected to the first port when the system is in the reverse discharge mode;

pressurizing the concentrate, via the high pressure pump, to a pressure that is greater than a predetermined threshold osmotic pressure of the system; and preventing production of permeate by closing the permeate discharge valve connected to the permeate outlet.

4. The method of claim 3, comprising:

switching the modes in sequential order:

from the forward flow mode to the reverse discharge mode, from the reverse discharge mode to the reverse flow mode, from the reverse flow mode to the forward discharge mode, and from the forward discharge mode to the forward flow mode.

5. The method of claim 1, comprising:

positioning an orifice in the first discharge line, wherein the orifice is sized to provide a predetermined pressure drop in the first discharge line that reduces pressure fluctuations caused by switching from the forward flow mode to the forward discharge mode.

6. The method of claim 3, comprising:

positioning a first orifice in the first discharge line, wherein the first orifice is sized to provide a first predetermined pressure drop in the first discharge line that reduces pressure fluctuations caused by switching from the forward or reverse flow mode to the forward discharge mode; and positioning a second orifice in the second discharge line, wherein the second orifice is sized to provide a second predetermined pressure drop in the second discharge line that reduces pressure fluctuations caused by switching from the forward or reverse flow mode to the reverse discharge mode.

\* \* \* \* \*